(12) United States Patent
Matsubara et al.

(10) Patent No.: US 7,134,541 B2
(45) Date of Patent: Nov. 14, 2006

(54) CONVEYANCE APPARATUS FOR PROCESSING STEP

(75) Inventors: Izuru Matsubara, Tokyo (JP); Hisashi Kyotani, Shiga (JP)

(73) Assignees: Taikisha Ltd., Tokyo (JP); Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/009,786

(22) Filed: Dec. 10, 2004

(65) Prior Publication Data

US 2005/0139158 A1  Jun. 30, 2005

(30) Foreign Application Priority Data

Dec. 26, 2003  (JP) .............................. 2003-431721
Apr. 27, 2004  (JP) .............................. 2004-130552
Nov. 10, 2004  (JP) .............................. 2004-325771

(51) Int. Cl.
   *B65G 29/00*  (2006.01)
   *B65G 47/24*  (2006.01)
   *B65G 17/32*  (2006.01)

(52) U.S. Cl. .............. 198/468.01; 198/378; 198/468.6; 198/468.9

(58) Field of Classification Search ................ 198/378, 198/468.01, 468.6, 468.9
   See application file for complete search history.

(56) References Cited

U.S. PATENT DOCUMENTS 2,980,271 A * 4/1961 Ulinski ........................ 414/707
4,564,100 A * 1/1986 Moon ....................... 198/341.07
4,589,819 A * 5/1986 Shirao ....................... 198/468.4
4,724,944 A * 2/1988 Koshigai et al. ............. 198/378
4,749,324 A * 6/1988 Rulison ........................ 414/10
5,984,081 A * 11/1999 Miyazawa .................. 198/509
6,715,981 B1 * 4/2004 Harsch et al. ............ 414/752.1

FOREIGN PATENT DOCUMENTS

| DE | 10010079 A1 | * | 9/2000 |
|---|---|---|---|
| DE | 102 11 214 | | 3/2003 |
| WO | 02/053482 | | 7/2002 |
| WO | 02/060598 | | 8/2002 |

OTHER PUBLICATIONS

Patent Abstracts of Japan vol. 017, No. 628 (M-1512), Nov. 19, 1993 -& JP 05 193715 A (Nakanishi Kinzoku Kogyo KK), Aug. 3, 1993.

* cited by examiner

*Primary Examiner*—Gene O. Crawford
*Assistant Examiner*—Leslie A. Nicholson, III
(74) *Attorney, Agent, or Firm*—Fildes & Outland, P.C.

(57) ABSTRACT

A conveyance truck movable along travel rails includes a suspended supporting device for supporting a vehicle body, a raising and lowering device for raising and lowering the suspended supporting device, and a posture adjusting device for adjusting the posture of the vehicle body. The raising and lowering device includes a first supporting axle disposed in the front section in the travel direction, a second supporting axle provided in the rear section movable towards and away from the first supporting axle, a crank arm supported rotatably on the second supporting axle and having the suspended supporting device supported rotatably at its free end portion, a swinging arm fixed to the first supporting axle and having a free end portion coupled to an intermediate position of the crank arm, and an arm drive mechanism for causing the crank arm to rotate about the second supporting axle.

5 Claims, 29 Drawing Sheets

F I G. 2
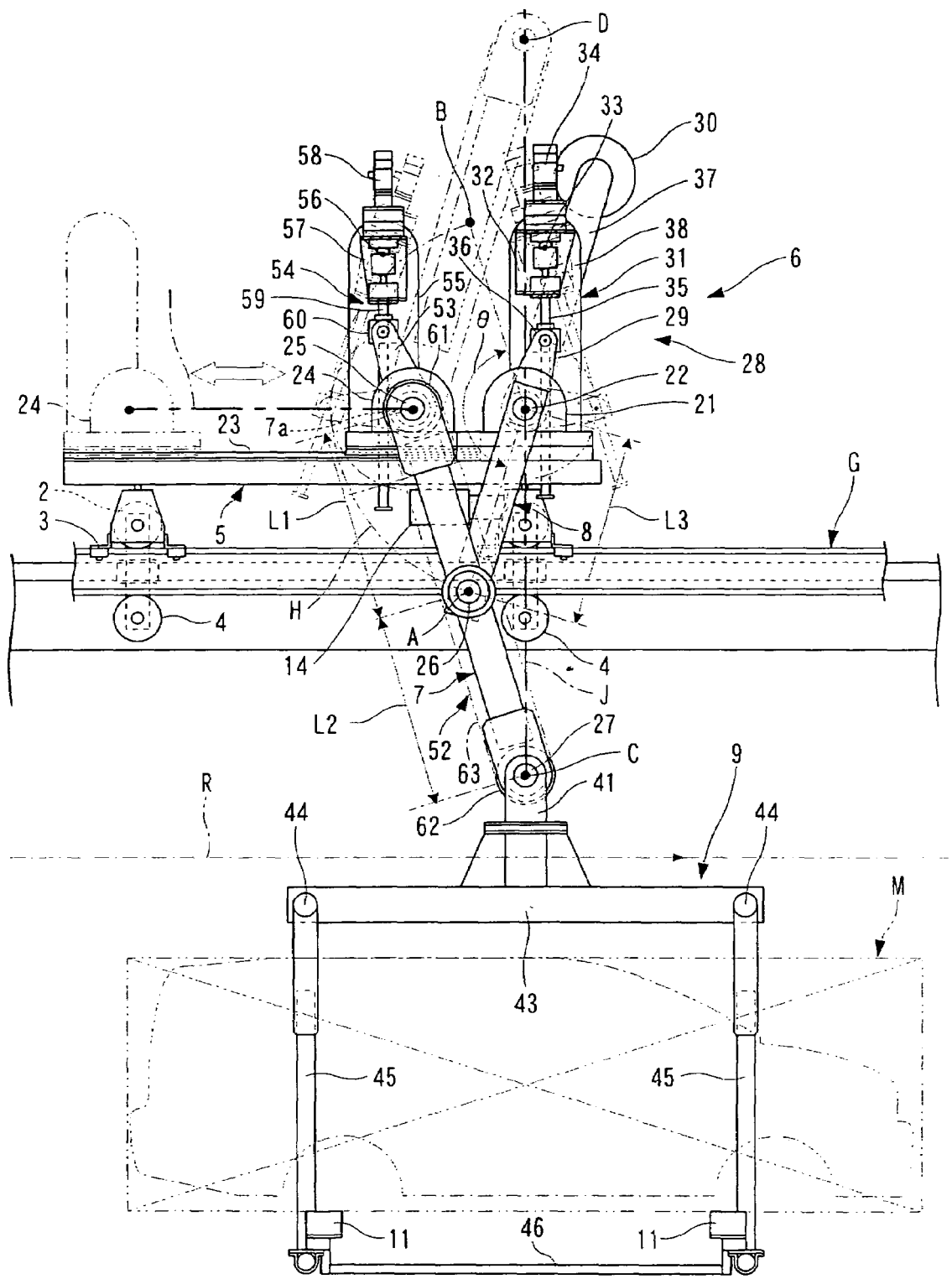

F I G. 20
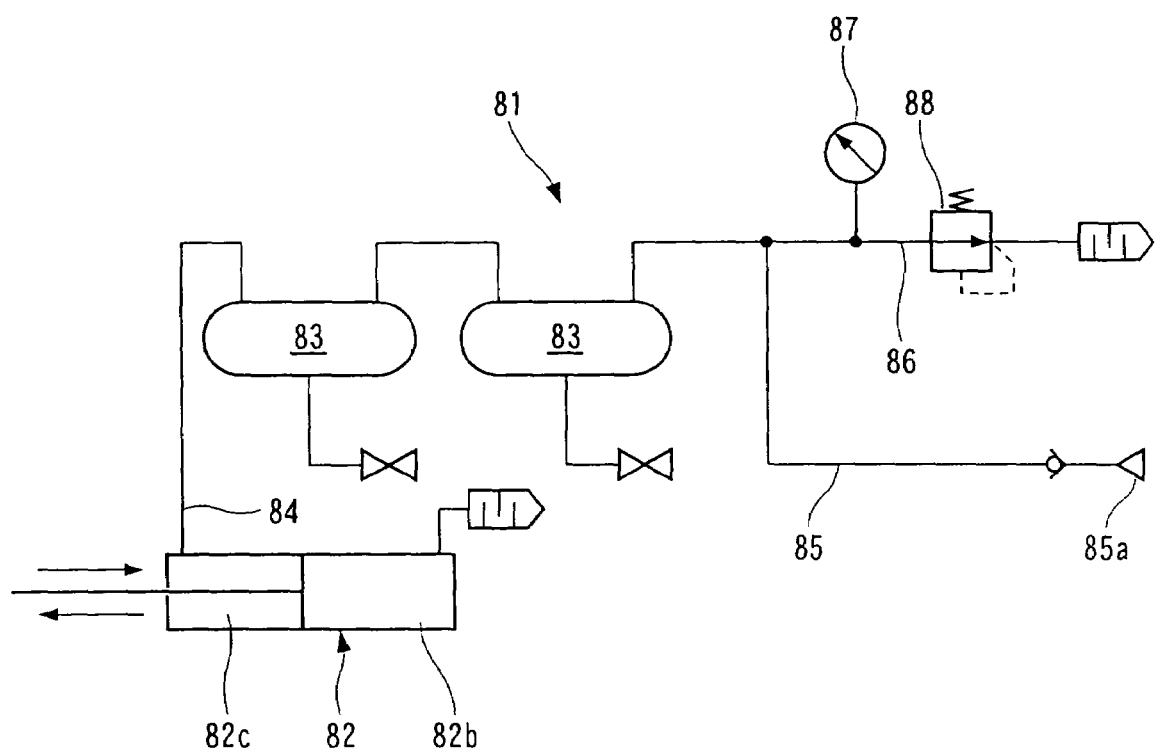

F I G. 2 2
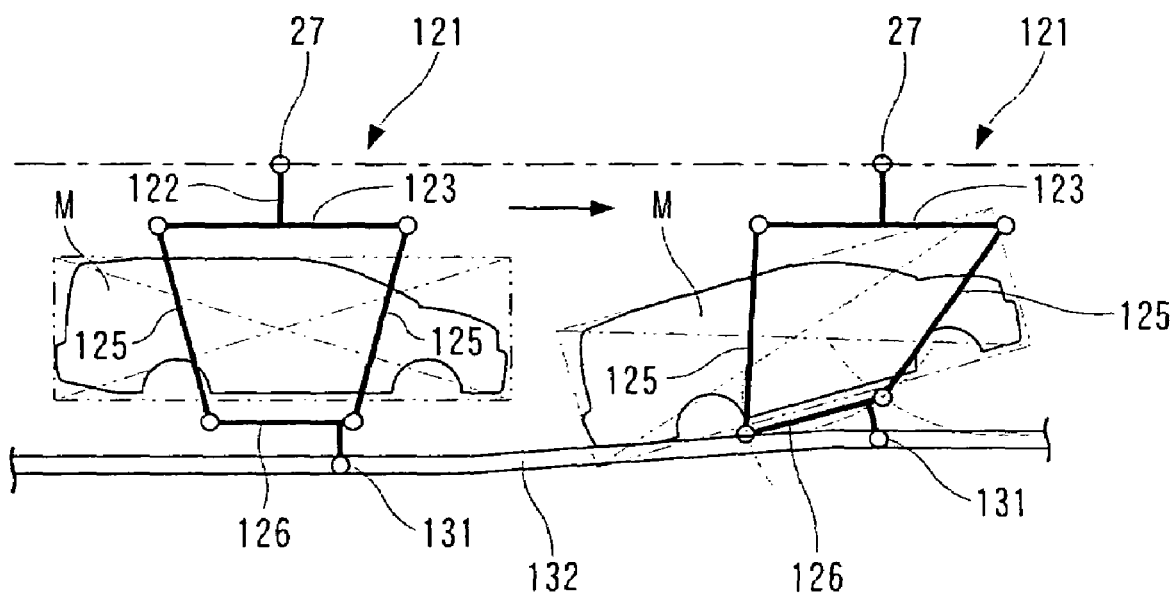

CONVEYANCE APPARATUS FOR PROCESSING STEP

BACKGROUND OF THE INVENTION

1. Field of the Invention

The present invention relates to a conveyance apparatus for a processing step, as used in a conveyance line in which processing is carried out, such as a coating line or a machining line in a manufacturing plant.

2. Description of the Related Art

A prior art example of a conveyance apparatus with which a vehicle body is coated while being conveyed is disclosed in International Patent WO 02/053482. This conveyance apparatus is provided with a conveyance truck that is able to travel over immersion tanks, and pairs of swinging arms are provided on the conveyance truck, as two sets, at the front section and at the rear section of the truck in the direction of travel. Supporting bars are installed respectively between the free end sections of the pairs of swinging arms, and a vehicle body is supported on top of the front side supporting bar and the rear side supporting bar. By causing the front and rear side swinging arms to rotate downwards, in either an independent fashion or a mutually combined fashion, the vehicle body held on the supporting bars is caused to descend and is introduced into a coating material.

However, in the conveyance apparatus according to the prior art described above, the vehicle body is raised and lowered along an arc-shaped path of descent. Therefore, it is necessary to form an entrance to the immersion tank and an exit from the same, each of a large dimension, in the direction of travel of the conveyance truck. Moreover, if the vehicle body is to be lowered in a perpendicular vertical direction, it is necessary to move the conveyance truck in the direction of travel. Furthermore, if the direction of descent and ascent of the vehicle body is an arc-shaped direction, then a problem arises in that the positional control of the vehicle body and the control of the posture of the vehicle body become complicated, when it enters into the treatment liquid and when it exits from the same.

SUMMARY OF THE INVENTION

It is an objective of the present invention to provide a conveyance apparatus for use in a processing step, whereby the positional control of the conveyed object is simplified and the raising and lowering operations for carrying out processing can be executed by means of simple controls, by causing the conveyed article to be raised and lowered along a movement path that is more proximate to a perpendicular vertical path.

The conveyance apparatus according to the present invention is a conveyance apparatus for a processing step in which a movable body (conveyance truck 1) is disposed movably along a processing line (coating line R) in which a processing liquid tank D is disposed, and a conveyed object (vehicle body M) held on the movable body is immersed into the processing liquid and processed; wherein the movable body is provided with: a suspended supporting device 9 for supporting the conveyed object M in such a manner that the posture of the object can be adjusted; a raising and lowering device (crank type raising and lowering device 6) for raising and lowering the suspended supporting device 9 with respect to the processing liquid tank D; and a posture adjusting device 51 for operating the suspended supporting device 9 and adjusting the posture of the conveyed object M; and the raising and lowering device 6 comprises: a first supporting axle 22 disposed in a horizontal direction that is orthogonal to the direction of travel, at either the front or rear of the movable body 1 in the direction of travel; a second supporting axle 25 disposed in parallel to the first supporting axle 22 at the other of the front or rear of the movable body 1 in the direction of travel, capable of moving towards and away from the first supporting axle 22; a crank arm 7, supported rotatably on the second supporting axle 25 and having the suspended supporting device 9 supported rotatably at the free end portion thereof by means of a free end supporting axle 27; a swinging arm 8, fixed to the first supporting axle 22 and having the free end portion thereof coupled to an intermediate position of the crank arm 7 by means of a coupling axle 26; and an arm drive device 28, 71 for causing the crank arm 7 to rotate about the second supporting axle 25. Since the second supporting axle 25 is able to move towards and away from the first supporting axle 22, then the path of travel of the free end portion of the crank arm 7 is formed in an approximately vertical direction, and the suspended supporting device 9 suspended from the free end portion of the crank arm 7 by means of the free end rotating axle is moved upwards and downwards in an approximately vertical direction.

BRIEF DESCRIPTION OF THE DRAWINGS

FIG. 2 is a side view showing a state of coating operation using a conveyance truck;

FIG. 20 is a configuration diagram of a raising and lowering assistance device of the conveyance truck;

FIG. 22 is a schematic side view illustrating another posture adjustment method for the suspended supporting device;

DESCRIPTION OF THE PREFERRED EMBODIMENTS

Below, an embodiment of a coating line apparatus (conveyance apparatus for processing steps) provided with a raising and lowering device for a vehicle body (article) relating to the present invention is described with reference to the drawings.

(First Embodiment)

Figure 4:
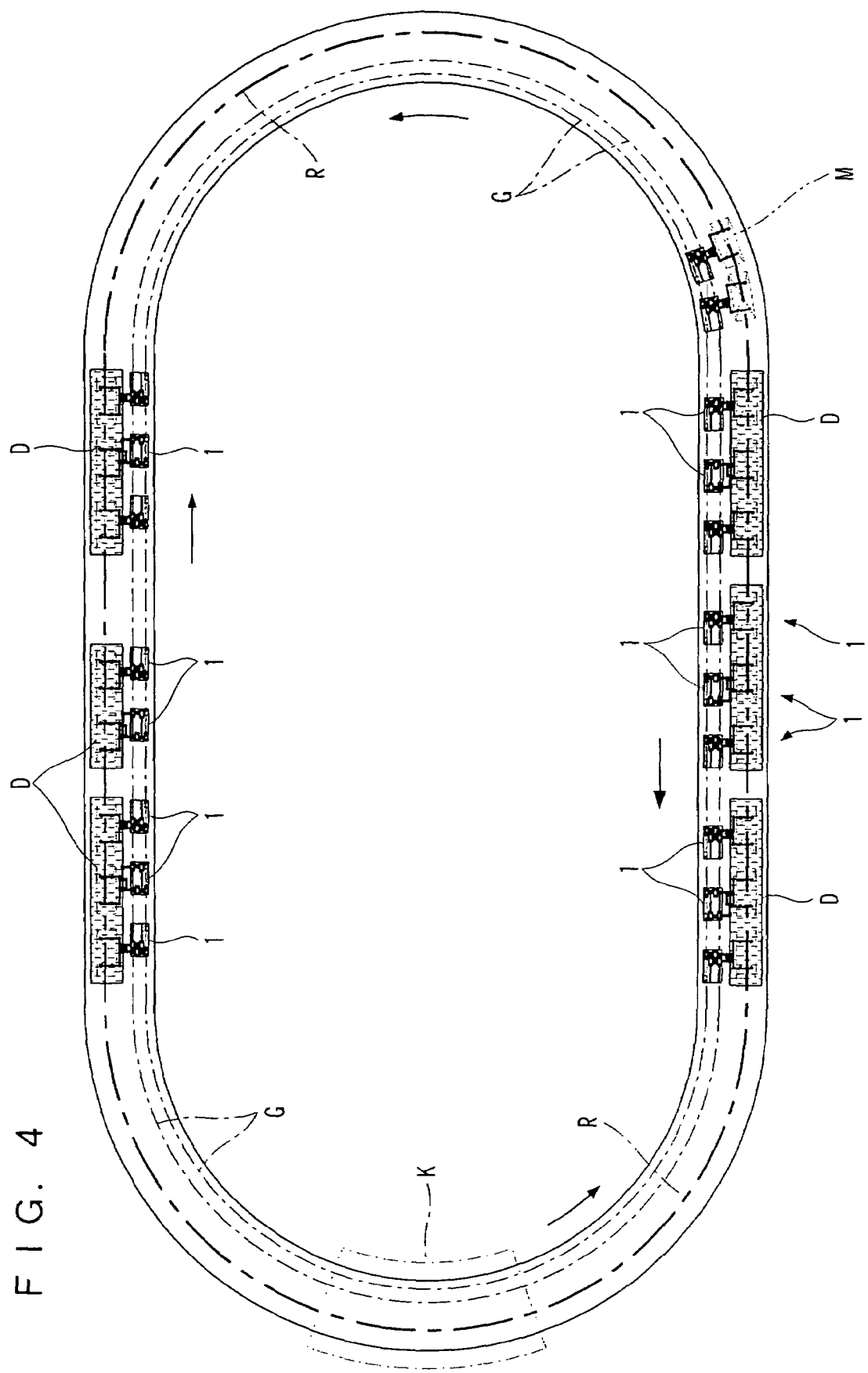
FIG. 4 is an overall schematic plan view of a coating line apparatus equipped with the conveyance truck.

This coating line apparatus is used to carry out, for example, a degreasing process, a pre-treatment process such as chemical treatment or the like, and undercoat painting, of a vehicle body M, which is a conveyed object, in an automobile plant. As shown in FIG. 4, the coating line (processing line) R is formed in an endless loop having the shape of an elongated circle in plan view (or in side view) or it is formed in a square-shaped path. The square-shaped path consists of an outward path and a return path, which are linearly shaped, for instance, and are mutually connected by means of traversers, which are path-to-path movement devices. At prescribed positions in the coating line R, there are installed a plurality of processing liquid tanks D, such as hot wash, degrease, cold wash, film formation, cold wash, and the like, and an entry and exit section K, processing liquids (for example, an electrodeposition processing liquid, washing liquid, or the like) being accommodated inside the processing liquid tanks D. Coating electrodes are disposed on the inner faces of the bottom wall and the left and right-hand side walls of the processing liquid tank for coating.

Figure 3:
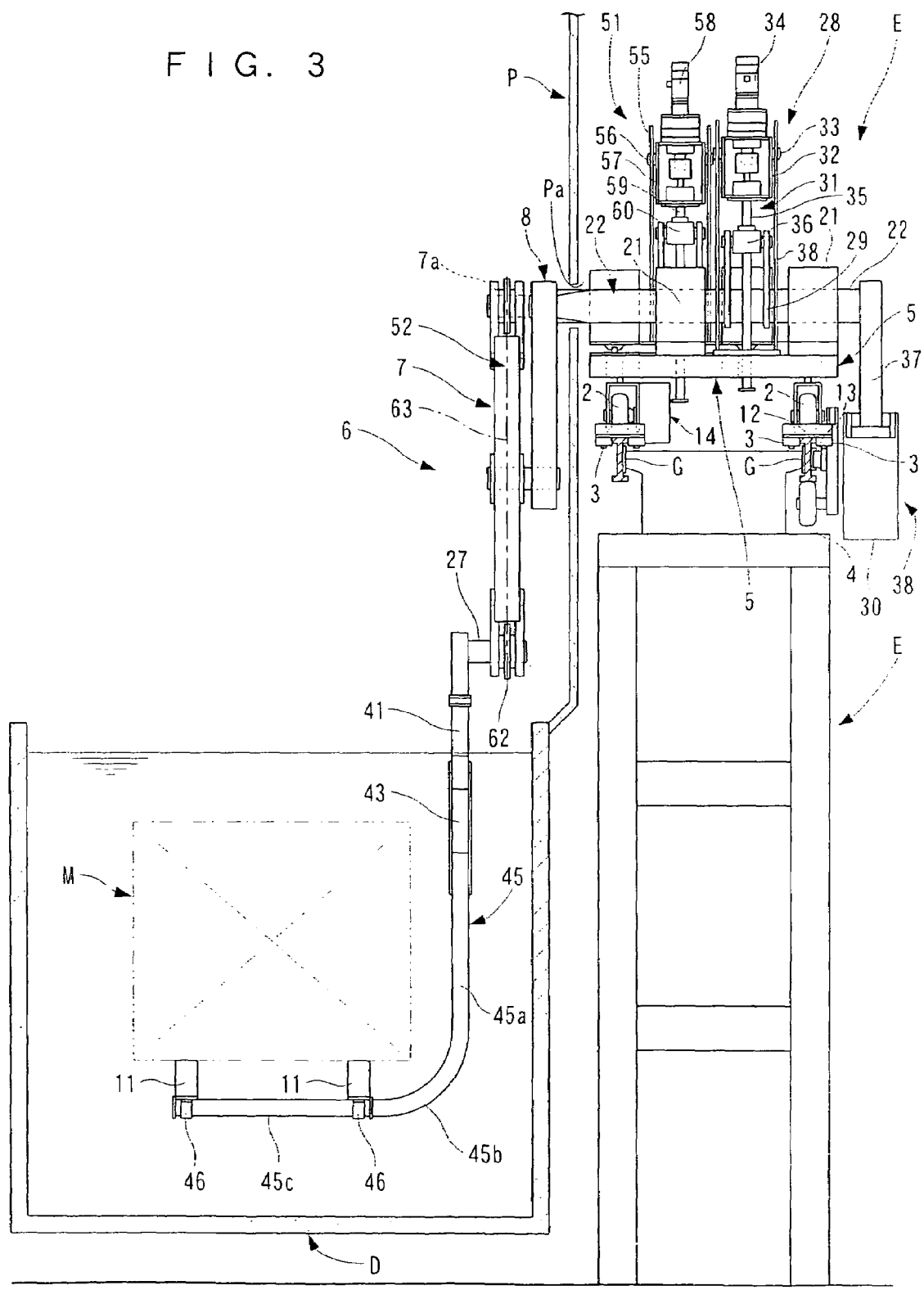
FIG. 3 is a front view showing a state of a coating operation using the conveyance truck.

As shown in FIG. 2 and FIG. 3, a guide structure E is disposed on one side of the processing liquid tank D, and a pair of travel rails G are laid in parallel with the coating line R on the guide structure E, these travel rails G being disposed in respective positions in a lateral direction that is orthogonal direction of travel of the conveyance truck 1. Furthermore, a plurality of self-propelled conveyance trucks 1 are disposed movably on the travel rails G. These conveyance trucks 1 are examples of movable bodies, and it is assumed that the movable bodies may also include suspended type traveling bodies, or the like, which are capable of traveling (moving) by being guided and supported by a rail provided in the ceiling section.

Vehicle wheels 2, 3 and 4, which are guided by the travel rails G, are provided on the truck main body 5 of the conveyance truck 1, and a crank type raising and lowering device 6 having a crank arm 7 and a swinging arm 8 is also installed on the main body 5. A suspended supporting device 9 having a parallel link mechanism is supported in a cantilevered fashion on the free end of the crank arm 7 of the raising and lowering device 6. Moreover, holding tools 11 are provided on the suspended supporting device 9, and a vehicle body M, which forms the conveyed object, is held by these holding tools 11.

A self-propelled travel device formed by travel wheels 2, anti-vibration wheels 3, anti-lift wheels 4, a current collector device 13, a travel drive device 14, and the like, is provided on the truck main body 5.

The travel wheels 2 are disposed approximately in the four corner positions of the truck main body 5, and they run over the travel rails G.

The anti-vibration wheels 3 prevent vibration of the truck main body 5 by abutting against the travel rails G on both the right and left-hand sides thereof.

The anti-lift wheels 4 prevent the truck main body 5 from lifting upwards by abutting against the under side of the travel rail G.

The travel drive device 14 is constituted by an electric motor and a gear device, and it drives the front side travel wheels 2 in rotation, thereby causing the conveyance truck 1 to travel.

The current collector device 13 is disposed following the direction of one of the travel rails G, and it collects electrical drive power from a power supply rail 12 installed to one side. This current collector device 13 uses a contact type current collection system, but it is also possible to use a non-contact current collector device.

A pair of fixed bearing members 21 are provided in the front portion of the truck main body 5, in respective positions in the lateral direction, and first supporting axles 22 are supported rotatably in a horizontal direction that is orthogonal to the direction of travel, on these fixed bearing members 21. Furthermore, a pair of guide rails 23, disposed in respective positions in the lateral direction, are laid in parallel with the direction of travel in the rear portion of the truck main body 5. A pair of movable bearing members 24 are disposed movably on the respective guide rails 23 via thrust bearings, in respective positions in the lateral direction. A second supporting axle 25 is supported rotatably in a horizontal direction that is orthogonal to the direction of travel, on these movable bearing members 24. The first supporting axle 22 and the second supporting axle 25 are positioned in the same horizontal plane. The base end portion of the swinging arm 8 is fixed to one end (the processing liquid tank D side) of the first supporting axle 22, and the base end portion of the crank arm 7 is supported rotatably via a bearing 7a on one end (the processing liquid tank D side) of the second supporting axle 25.

As shown in FIG. 2, the free end portion of the swinging arm 8 is coupled rotatably via a linking axle 26 to an intermediate portion of the crank arm 7. Furthermore, the suspended supporting device 9 is supported via a free end supporting axle 27 on the free end portion of the crank arm 7. Here, taking the length of the crank arm 7 from the second supporting axle 25 to the linking axle 26 to be L1, the length of the crank arm 7 from the linking axle 26 to the free end supporting axle 27 to be L2, and the length of the swinging arm 8 from the first supporting axle 22 to the linking axle 26 to be L3, then optimally, the lengths are set in such a manner that L1:L2:L3=1:1:1. This is because, as shown in FIG. 2, if the first supporting axle 22 is driven and rotated, thereby causing the swinging arm 8 to rotate up to a maximum angle of θ (for example, 160° in the case of FIG. 2) and moving the linking axle 26 between positions A and B in a first arc-shaped path of travel H, then the second supporting axle 25 moves along a linear path of travel I in the forward/rearward direction via the movable bearing members 24, and the free end supporting axle 27 on the free end portion of the crank arm 7 moves between positions C and D on a vertical path of travel J. Here, even if L1:L2:L3≈1:1:1, it is still possible to create an approximately vertical path of travel and hence a prescribed range of tolerance is allowed.

The arm drive device for driving the crank type raising and lowering device 6 may be (1) a rotational drive device for rotating the first supporting axle 22, (2) a rotational drive device for rotating the second supporting axle 25, or (3) a vertical movement device for moving the movable bearing members 24 in the direction of travel. Here, device type (1), namely, a rotational drive device which rotates the first supporting axle 22, is employed.

The arm drive device 28 is constituted by a first passive lever 29 for raising and lowering which is provided in a projecting fashion from the first supporting axle 22, a screw type first linear drive device (linear drive device) 31 for rotating the first passive lever 29, provided on the fixed bearing members 21, and a balance weight 30 constituting a raising and lowering assistance device 38. In other words, the first passive lever 29 is affixed to the first supporting axle 22 between the fixed bearing members 21.

The first linear drive device 31 is constituted by a first swinging bracket 32, a raising and lowering drive device (electric motor) 34, a first ball screw shaft 35 and a first female screw member 36. The free end portion of the first passive lever 29 is coupled via the first female screw member 36 to the first ball screw shaft 35 that is driven in rotation by the raising and lowering drive device 34.

The first swinging bracket 32 is supported rotatably via a laterally disposed first supporting pin 33 on the upper end section of the first supporting plate 39.

The raising and lowering drive device 34 is provided on the first swinging bracket 32 and is driven so as to rotate.

The first ball screw shaft 35 is driven in rotation by the raising and lowering drive device 34 via a reducing gear device.

The first female screw member 36 is provided rotatably on the free end portion of the first passive lever 29, and it engages with the first ball screw shaft 35.

Furthermore, the raising and lowering assistance device 38 provided on the other end of the first supporting axle 22 is constituted by a weight lever 37 provided in a projecting manner in the relative direction of the first passive lever 29, and a balance weight 30 installed via this weight lever 37, and it is composed in such a manner that the load on the raising and lowering drive device 34 is reduced.

Here, if the first ball screw shaft 35 is driven in rotation by the raising and lowering drive device 34 thereby causing the first female screw member 36 to move by a prescribed amount, then the first supporting axle 22 is rotated through a range of θ° (160° in FIG. 2) via the first passive lever 29, and the first swinging bracket 32 swings about the first supporting pin 33. Thereby, the swinging arm 8 is rotated through θ°, the linking axle 26 is moved along the first arc-shaped path of travel H, and the movable bearing members 24 and the second supporting axle 25 are moved along a linear path of travel I via the crank arm 7, while at the same time, the crank arm 7 is rotated within a range of θ° about the second supporting axle 25, the free end supporting axle 27 is raised or lowered along a vertical path of travel J, and the suspended supporting device 9 is raised or lowered.

Figure 1:
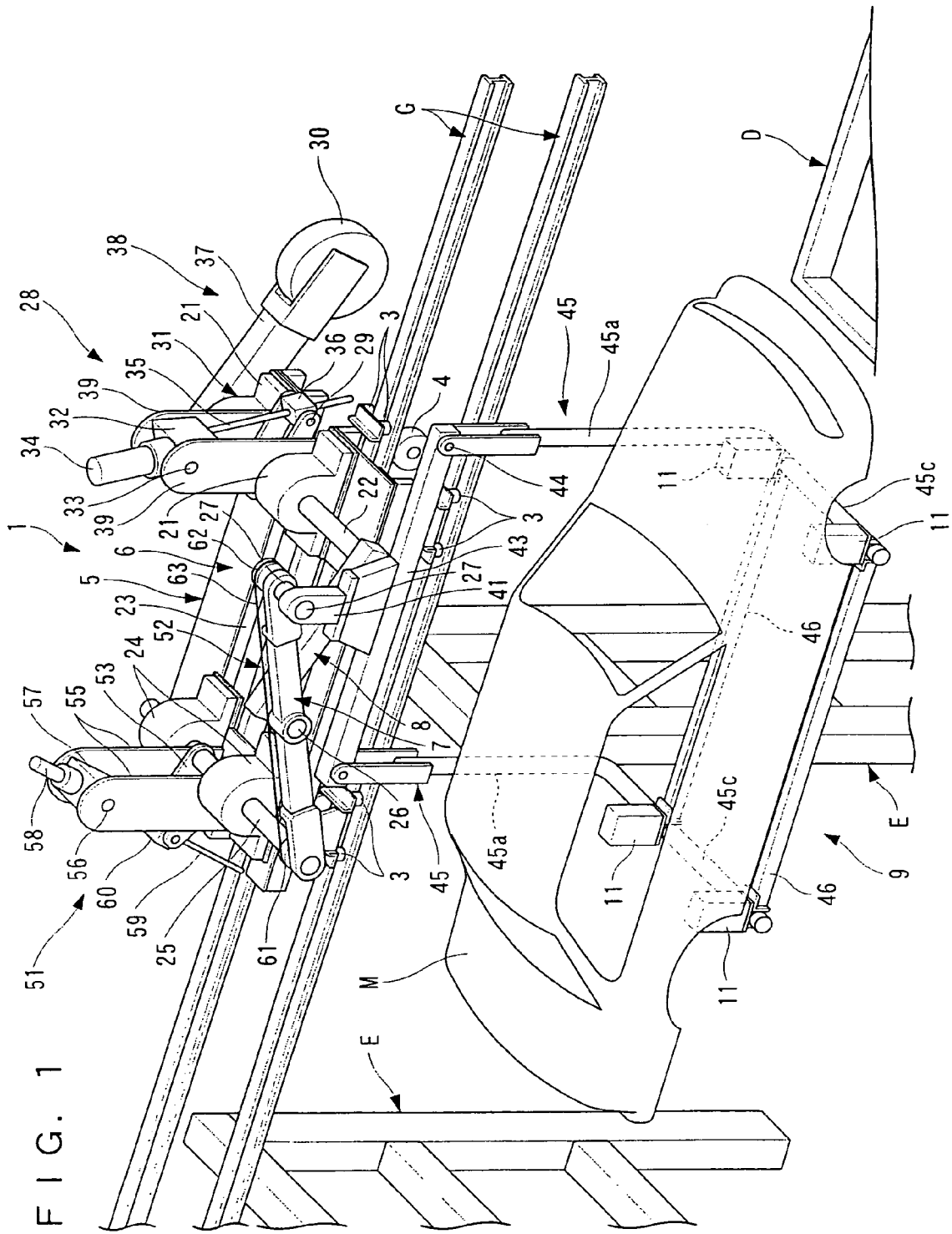
FIG. 1 is a perspective view showing a coating line apparatus according to a first embodiment of the present invention.
Figure 5:
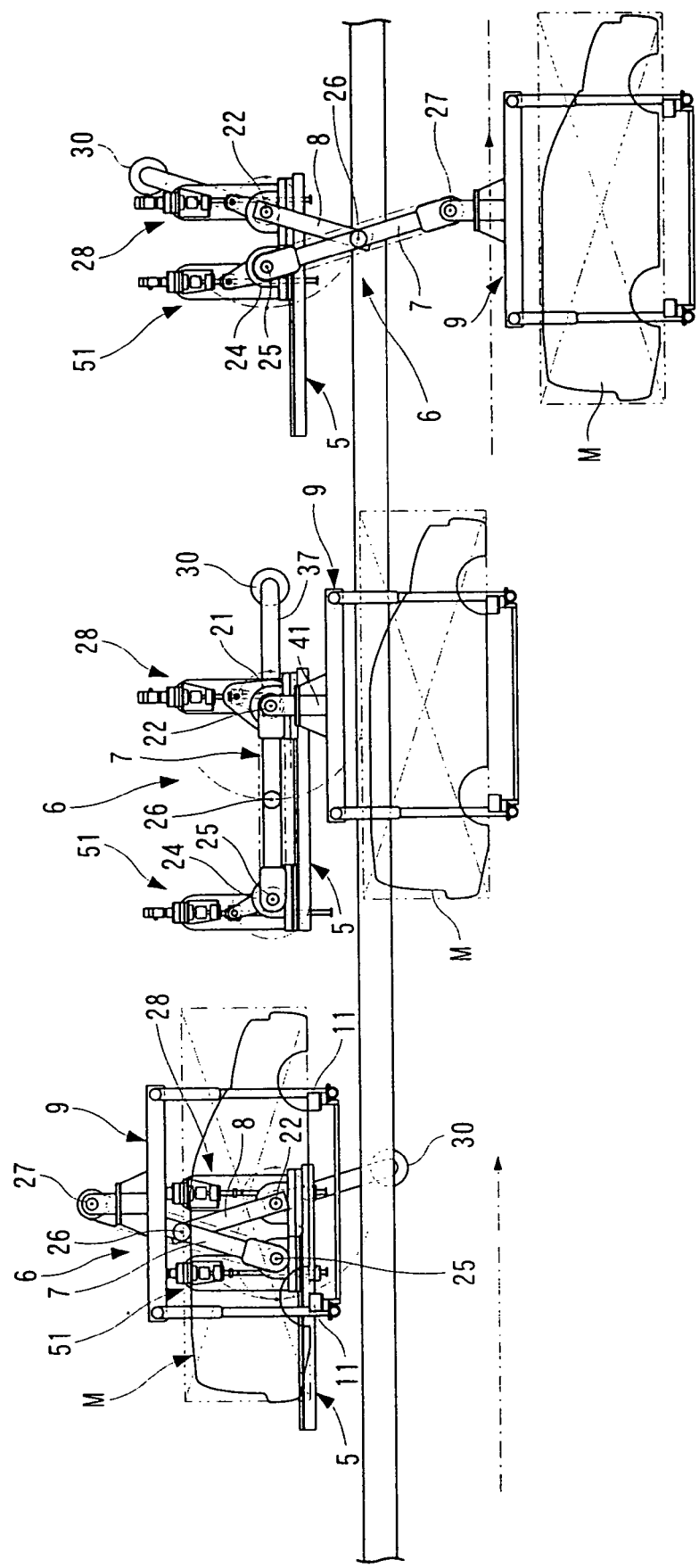
FIG. 5 is a side view showing a raising and lowering operation of the conveyance truck.
Figure 6:
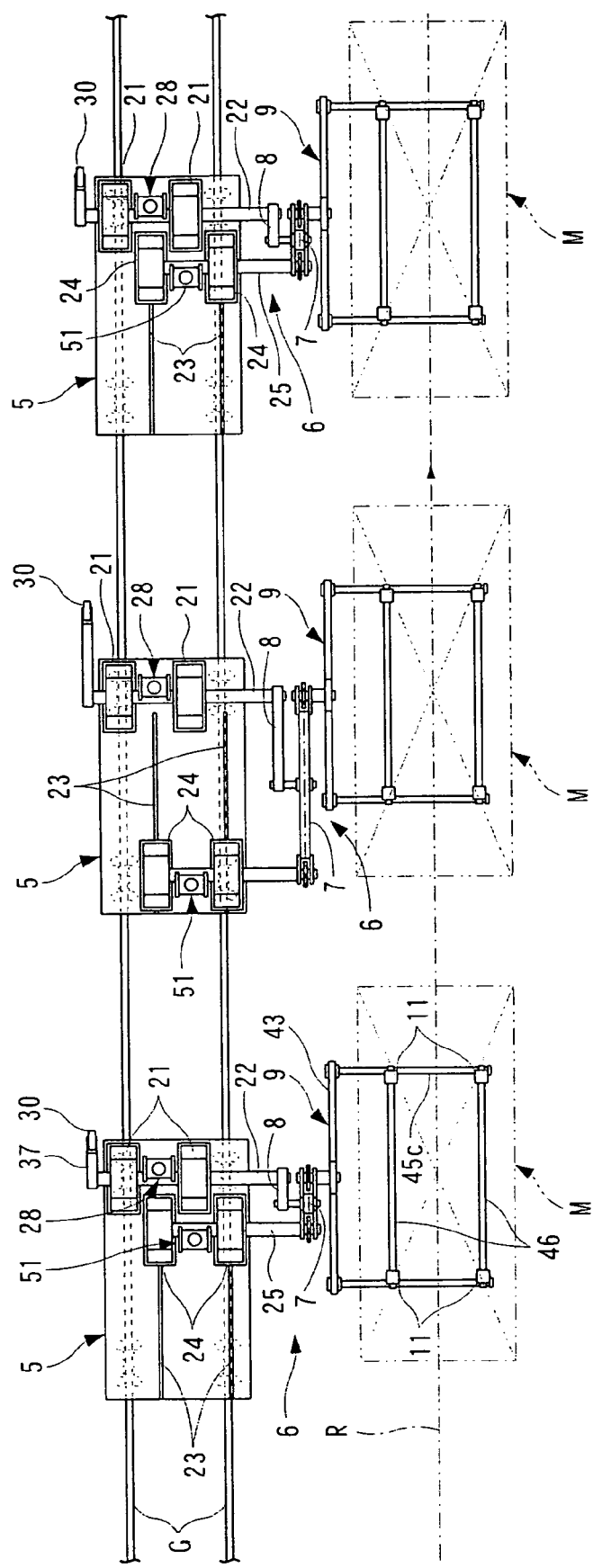
FIG. 6 is a plan view of the conveyance truck shown in FIG. 5.

In the limit position where the angle of tilt of the crank arm 7 is a maximum when viewed from the side, as shown by the left-hand side of FIG. 5 and FIG. 6, the free end supporting axle 27 is located in an uppermost position, the vehicle body M is raised up to the height position of the conveyance truck 1 and the vehicle body M is placed in a liquid entry posture or a liquid exiting posture where it is inclined to a maximum. Furthermore, in the intermediate position where the angle of tilt is 0°, the vehicle body M is positioned slightly below the normal conveyance posture (the posture in FIG. 1), as illustrated in the central portion of FIG. 5 and FIG. 6. Moreover, in the lowermost position where the angle of bending of the crank arm 7 is a maximum, the vehicle body M assumes an immersion posture wherein it is lowered up to the maximum depth of the processing liquid tank D, as illustrated in the right-hand side of FIG. 5 and FIG. 6.

The suspended supporting device 9 has a parallel link mechanism constituted by a suspended member 41, an upper beam 43, suspended frames 45, coupling beams (lower beams) 46, and the like.

The suspended member 41 is supported rotatably on the free end portion of the crank arm 7, by means of a free supporting axle 27 that is parallel to the second supporting axle 25.

The upper beam 43 is provided in a standing fashion, taking the suspended member 41 as a central portion.

The suspended frames 45 and 45 hang rotatably about suspending pins 44 and 44 disposed in parallel with the free supporting axle, from either end portion of the upper beam 43. These suspended frames 45 are respectively formed in an L shape when viewed from the front, comprising a vertical section 45a suspended and supported from a suspending pin 44, a radius section 45b extending in a curved fashion from the lower end of the vertical section 45a, and a horizontal supporting section 45c which projects towards one side (the processing liquid tank D side). The two horizontal supporting sections 45c, 45c are also provided respectively with holding tools 11 capable of holding a vehicle body M, provided on the respective end portions of the coupling beams 46. Here, the suspended member 41 is disposed in the central portion of the upper beam 43, but the suspended member 41 may also be shifted in the forward or rearward direction in accordance with the shape of the vehicle body, provided that it is located between the suspending pins 44 and 44. Furthermore, it is also possible to support a prescribed position of the upper beam 43 directly by means of a free end supporting axle 27.

The end portions of the coupling beams 46 and 46 are respectively coupled rotatably between the lower portions of the suspended frames 45 and 45 on each front and rear sides, and are provided in parallel with the upper beam 43.

A posture adjusting device 51 disposed on the movable bearing members 24 drives the suspended supporting device 9 via a transmission device 52 for posture adjustment that is provided on the crank arm 7, whereby a vehicle body M held on the suspended frames 45 can be adjusted to a forward tilting posture, a horizontal posture or a rearward tilting posture (not illustrated).

More specifically, the posture adjusting device 51 is equipped with a second passive lever 53 projecting from the second supporting axle 25, and a screw-type second linear drive device (linear drive device) 54, attached to the movable bearing members 24, which causes the second passive lever 53 to rotate. The second passive lever 53 is fixed to the second supporting axle 25 between the movable bearing members 24.

The second linear drive device 54 is constituted by a second swinging bracket 57, a posture adjusting drive device (electric motor) 58, a second ball screw shaft 59, a second female screw member 60, and the like, and the free end portion of the second passive lever 53 is coupled via the second female screw member 60 to the second ball screw shaft 59, which is driven so as to rotate by the posture adjusting drive device 58.

The second swinging bracket 57 is supported rotatably on the upper end portion of a second supporting plate 55, via a laterally disposed second supporting pin 56.

The posture adjusting drive device 58 is provided on the second swinging bracket 57 and is driven in rotation.

The second ball screw shaft 59 is driven in rotation by the posture adjusting drive device 58, via a gear device.

The second female screw member 60 is provided rotatably on the free end portion of the second passive lever 53, and it engages with the second ball screw shaft 59.

Furthermore, the transmission device 52 for posture adjustment is constituted by a drive sprocket 61 fixed to one end of the second supporting axle 25, a passive sprocket 61 fixed to the free end supporting axle 27, and a transmission chain 63 wound about the drive sprocket 61 and the passive sprocket 62 and providing a drive coupling between the same. The sprockets 61, 62, and the transmission chain 63 illustrated in the drawings are exposed externally. However, the crank arm 7 is not to be immersed in the processing liquid in the processing liquid tank D, and in practice, the crank arm 7, the sprockets 61, 62 and the transmission chain 63 are provided with covers (not illustrated) in order to protect them from the processing liquid.

Here, if the second ball screw shaft 59 is driven in rotation by the posture adjusting drive device 58 and the second female screw member 60 is moved by a prescribed amount, then the second passive lever 53 is driven, the second supporting axle 25 is rotated, and the second swinging bracket 57 swings about the second supporting pin 56. Thereby, the rotational force of the second supporting axle 25 is transmitted from the drive sprocket 61 via the transmission chain 63 to the passive sprocket 62, the free end supporting axle 27 is rotated, and the suspended supporting device 9 is rotated about the free end supporting axle 27. Accordingly, the posture of the vehicle body M held on the front and rear holding tools 11 is adjusted by means of the parallel link mechanism.

As shown in FIG. 3, the suspended supporting device 9 is supported in a cantilevered fashion, and it is formed in an L shape when viewed from the front. Therefore, the suspended supporting device 9 having a parallel link mechanism is supported on the free end supporting axle 27 without creating any obstacle above the vehicle body M that is held by the holding tools 11, and hence the inclined posture of the vehicle body M can be increased to a large angle, while the forward and rearward movement of the vehicle body M can be made small, and the driving force (the rotational moment) on the free supporting axle 27 can be reduced significantly.

Figure 7:
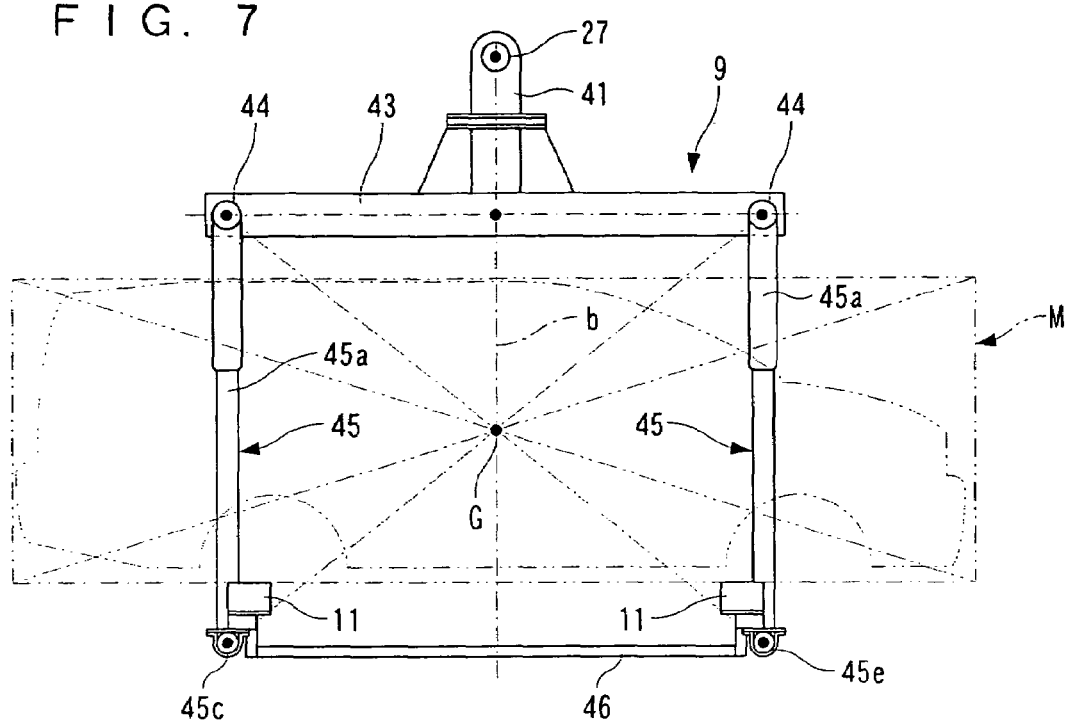
FIG. 7 is a side view showing a horizontal conveyance state of a suspended supporting device of the conveyance truck.
Figure 8:
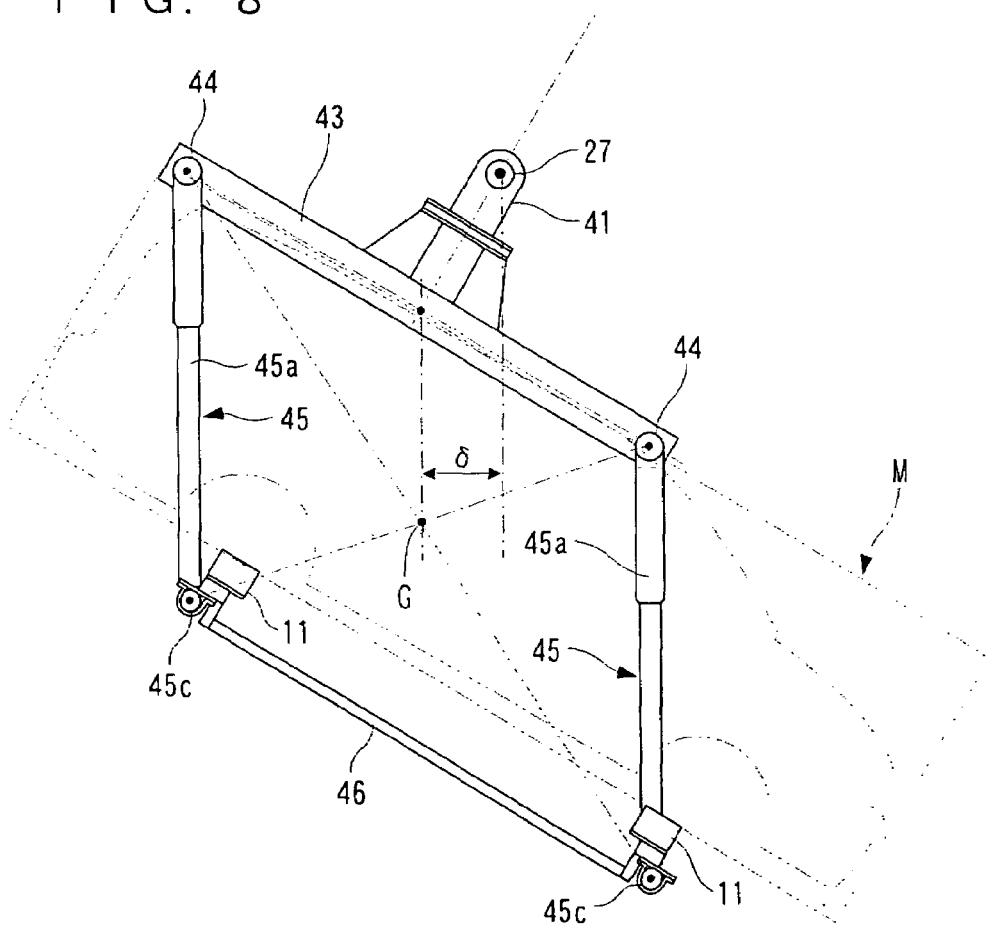
FIG. 8 is a side view showing an inclined state of the suspended supporting device of the conveyance truck.

More specifically, as shown in FIG. 7, the centre of the parallel link type suspended supporting device 9 (namely, the intersection of the diagonals thereof) coincides with the centre of gravity G of the suspended supporting device 9 and the vehicle body, and in a horizontal conveyance posture, the centre of gravity G is situated on the vertical line b. When the free supporting axle 27 is rotated through 30° in the clockwise direction, as shown in FIG. 8, then the upper beam 43, the coupling beams 46 and the vehicle body M are inclined upwards at the rear end by 30°. In this case, the vertical sections 45a of the suspended frame 45 are not inclined and are in a vertical posture, and the amount of displacement of the vehicle body M in a forward and rearward direction is $\gamma$. This is equal to or less than one half of the displacement $\epsilon$ of the suspended supporting device 9', which is not a parallel link mechanism, and the driving force of the free supporting axle 27 can also be made extremely small.

In FIG. 3, P is a cover plate which divides the conveyance truck 1 and the processing liquid tank D, and it is formed with an insertion space Pa where the first supporting axle 22 and the second supporting axle 25 fit together and move, this insertion space Pa being formed in parallel with the coating line R.

Figure 11:
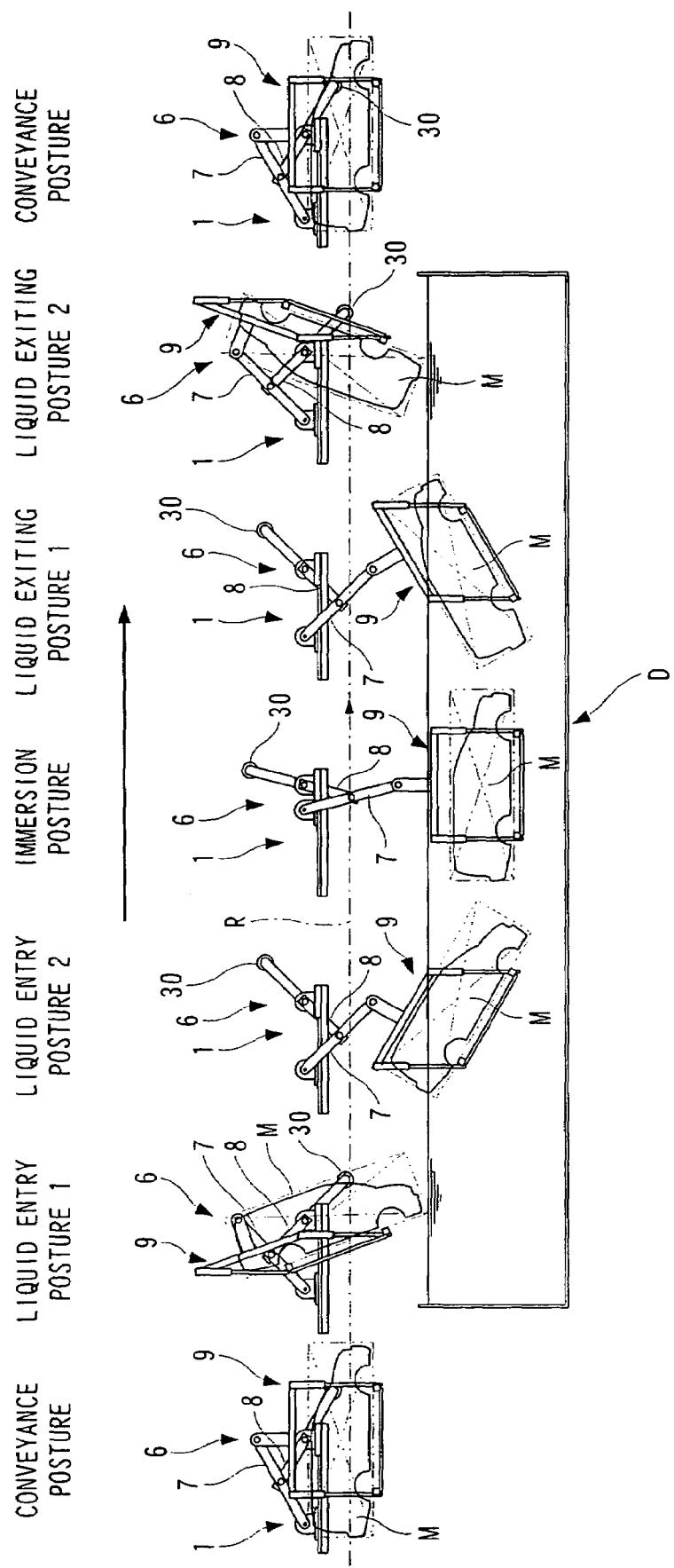
FIG. 11 is a side view showing consecutive coating operations of a vehicle body.
Figure 12:
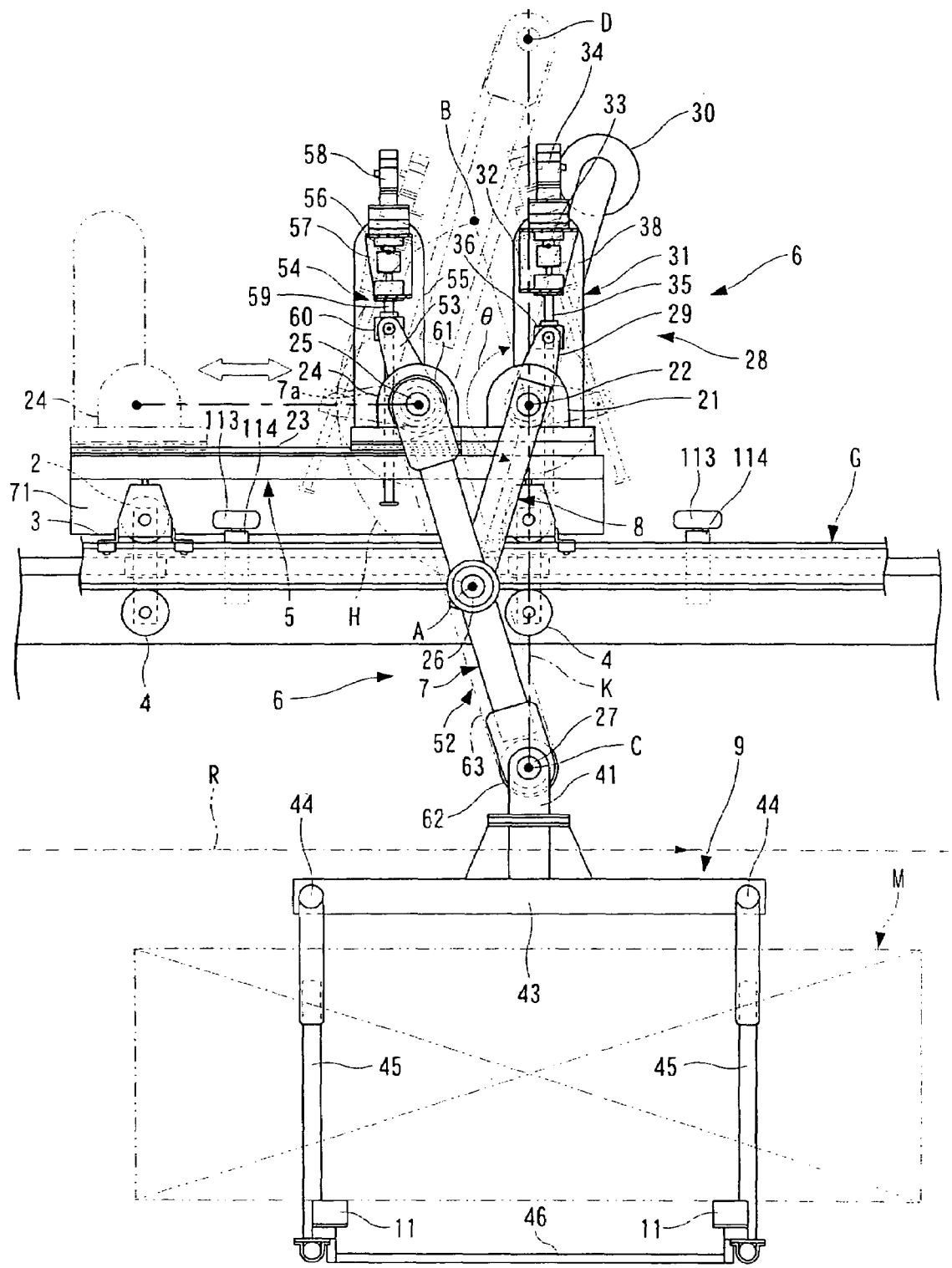
FIG. 12 is a side view showing a conveyance truck having a different type of travel system.
Figure 13:
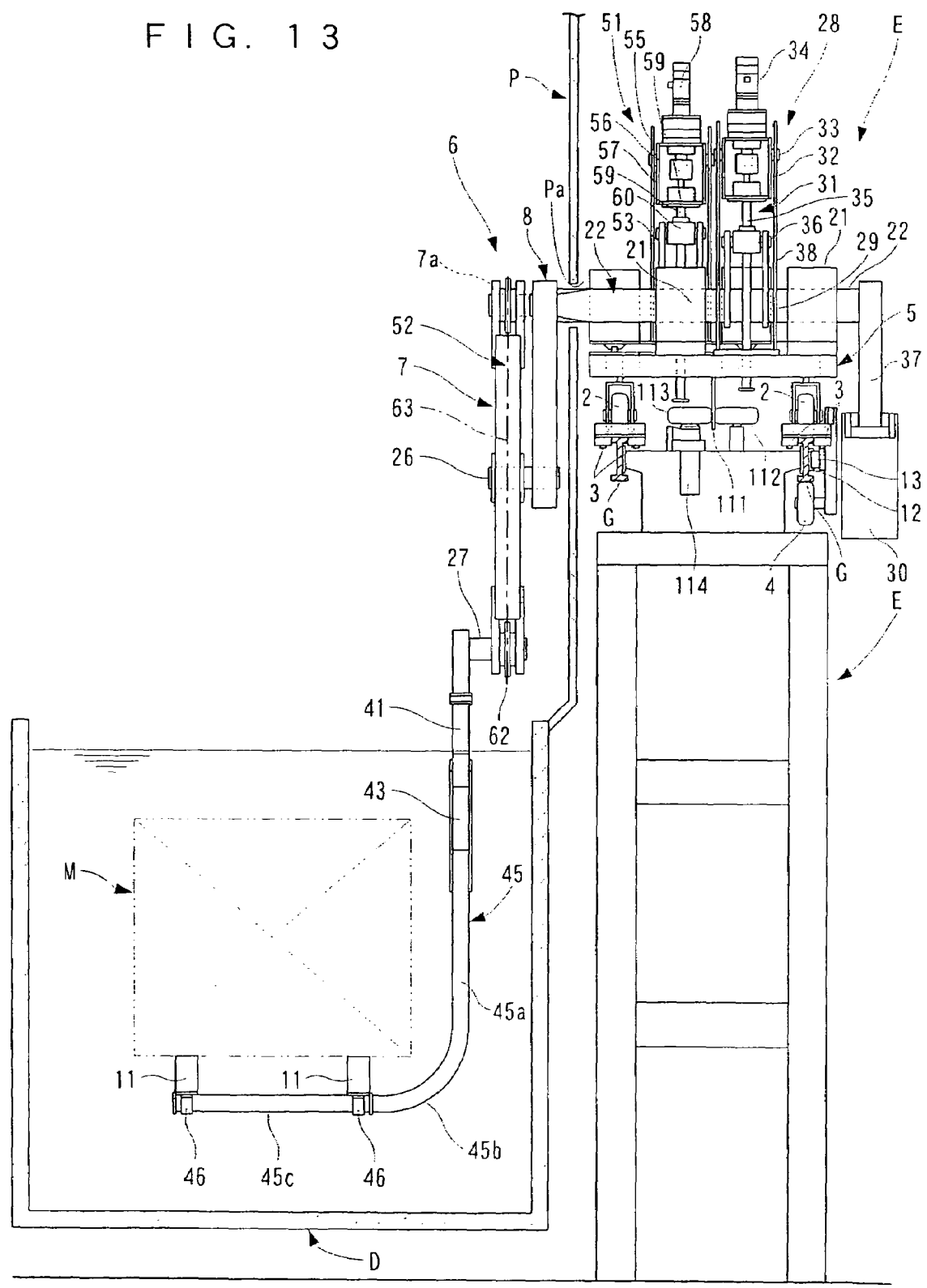
FIG. 13 is a front view showing a state of coating operation using the conveyance truck having a different type of travel system.
Figure 14:
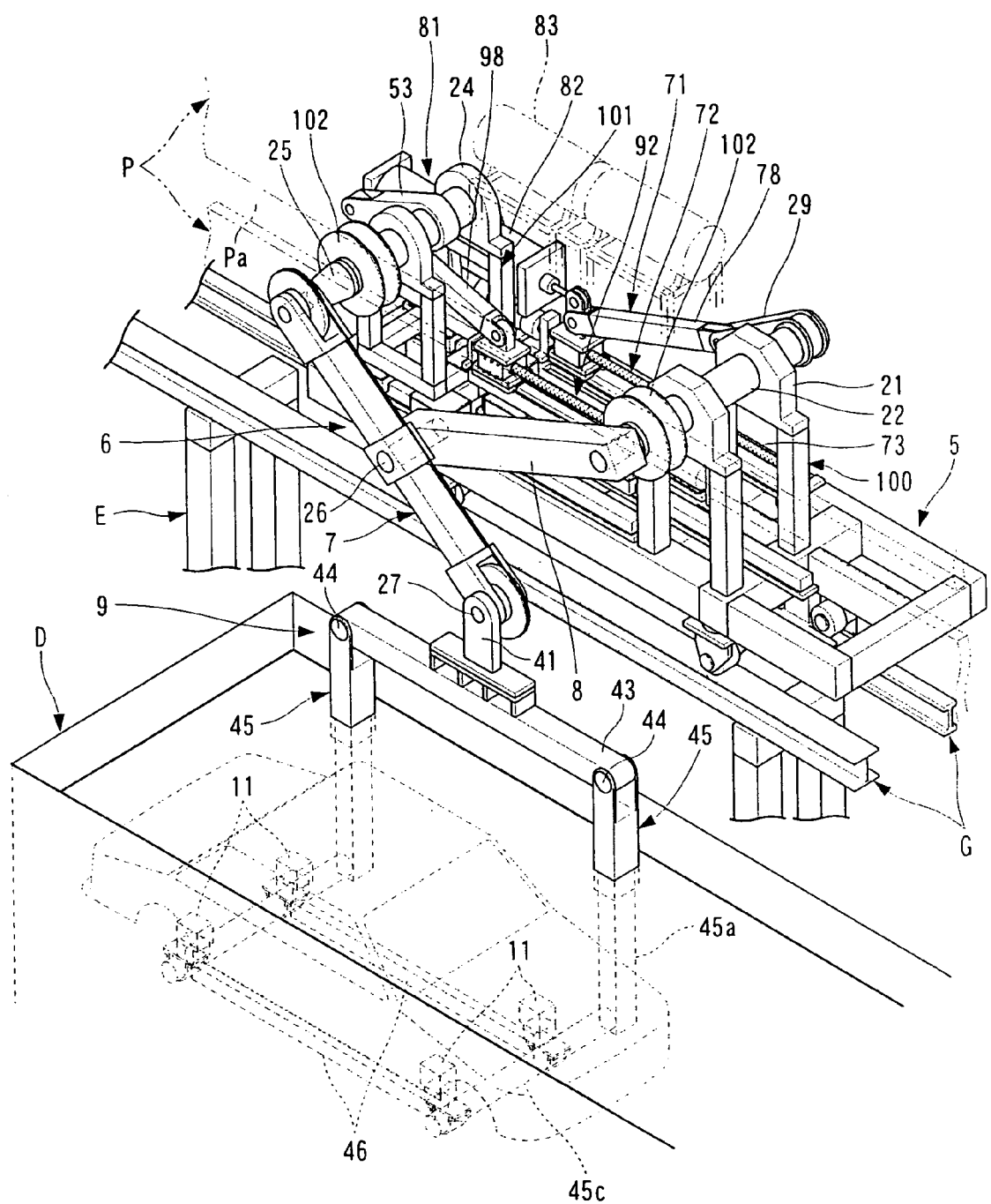
FIG. 14 is a perspective view showing a coating line apparatus according to a second embodiment of the present invention.
Figure 15:
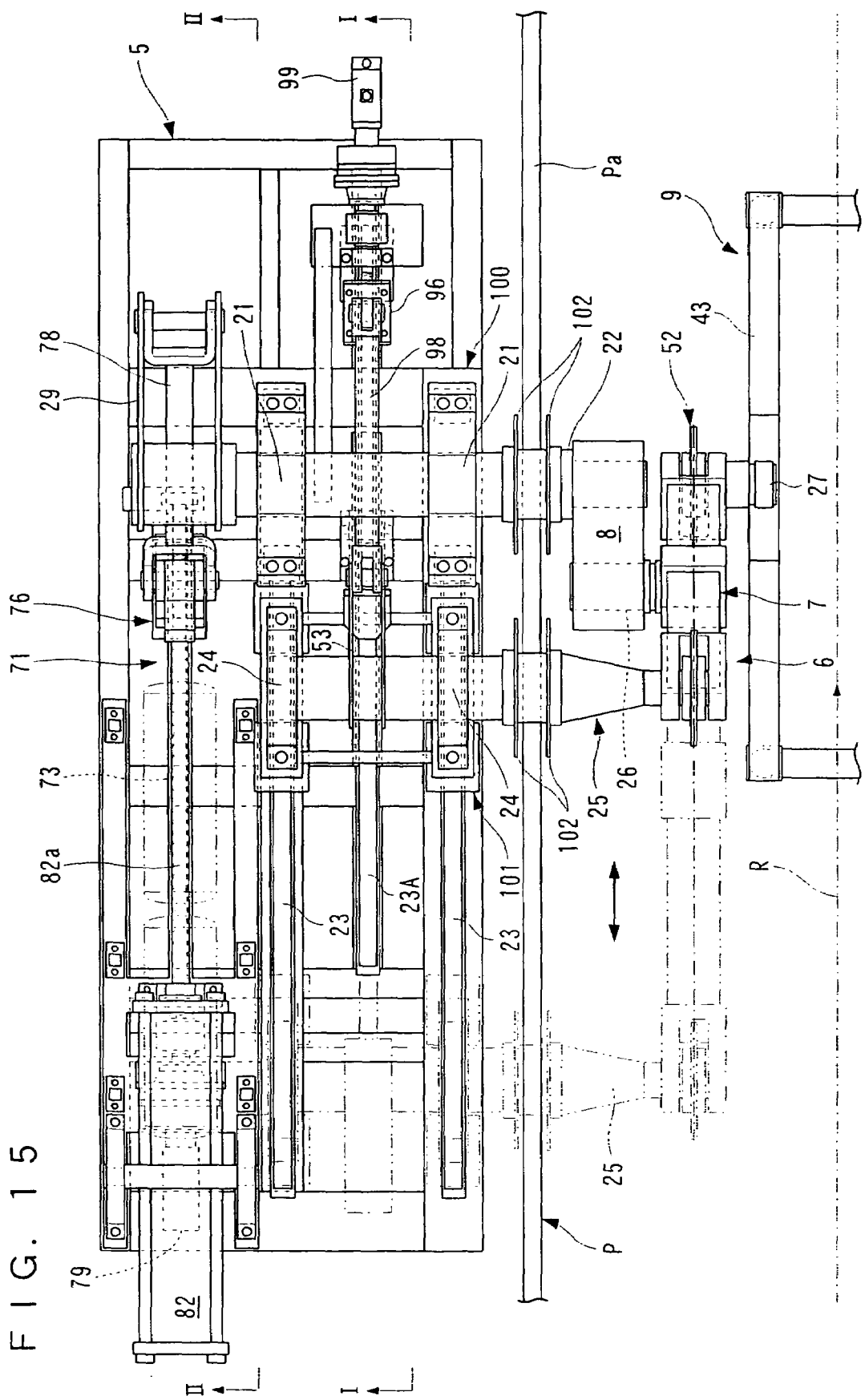
FIG. 15 is an overall plan view of the conveyance truck.

The operation of the coating line equipment having the aforementioned composition is now described with reference to FIG. 11, and other drawings.

1) By driving the wheels 2, 3 and 4 in rotation by means of the travel drive device 14, in a state where the vehicle body M is held in a horizontal conveyance posture on the suspended supporting device 9 via the holding tools 11, the conveyance truck 1 is guided respectively by the travel rails G and is moved over the coating line R.

Figure 9:
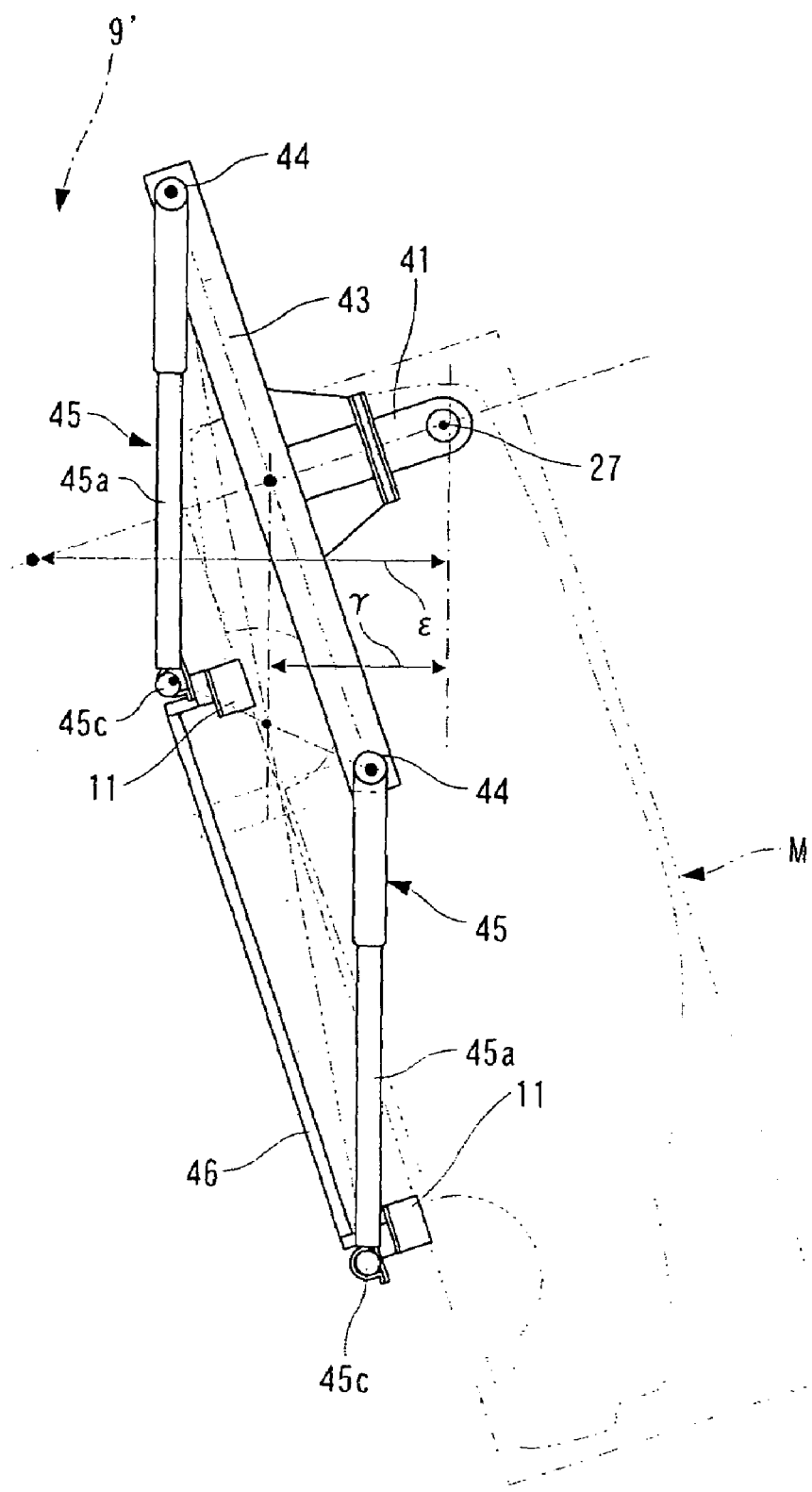
FIG. 9 is a side view showing a maximum state of inclination of the suspended supporting device of the conveyance truck.
Figure 10:
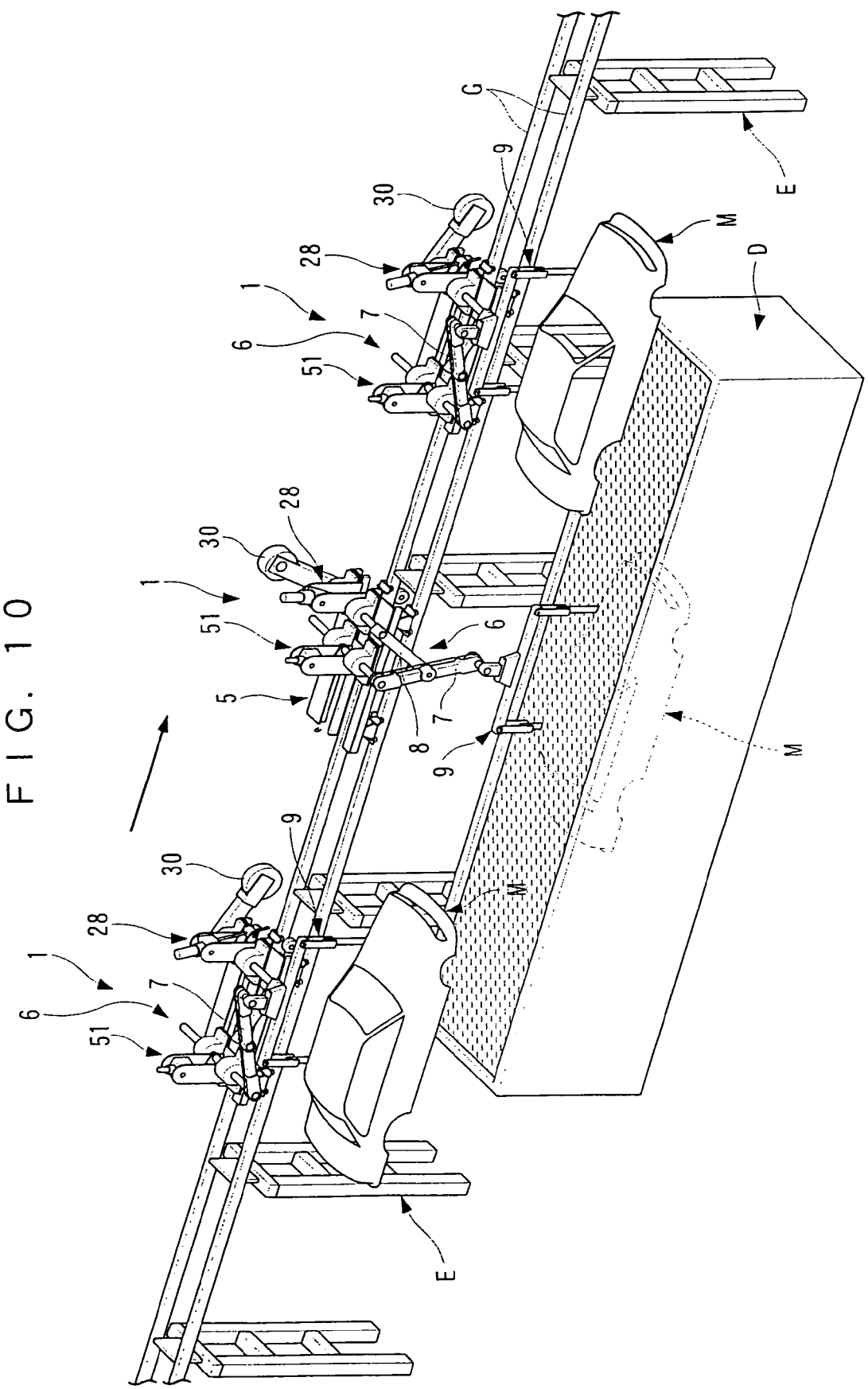
FIG. 10 is a perspective view illustrating a coating operation of a vehicle body by means of the conveyance truck.

2) When a conveyance truck 1 is introduced into the entrance to the processing liquid tank D, the raising and lowering drive device 34 of the arm drive device 28 is driven, the first ball screw shaft 35 is rotated, the first supporting axle 22 is rotated via the first passive lever 29, thereby causing the free end portion of the swinging arm 8 to rotate upwards, the crank arm 7 is rotated about the second supporting axle 25, and the free end portion of the crank arm 7 is rotated upwards via the linking axle 26. Thereby, the movable bearing members 24 and the second supporting axle 25 are moved along a linear path of travel I and the free end supporting axle 27 is moved upwards along the vertical path of travel J. Simultaneously with this, the posture adjustment drive device 58 of the posture adjusting device 51 is actuated, the second supporting axle 25 is caused to rotate via the second ball screw shaft 59, the second female screw member 60 and the second passive lever 53, and the free end supporting axle 27 is rotated by the transmission device 52, in such a manner that the vehicle body M carried on the suspended supporting device 9 assumes a posture for entry into the liquid wherein the vehicle body M is inclined so that the front portion thereof faces downwards, as shown by the second illustration from the left in FIG. 11. Here, the posture of maximum inclination of the vehicle body M depends on the shape of the vehicle body, but it is, for example, 80°, as shown in FIG. 9.

3) When the raising and lowering drive device 34 of the arm drive device 28 is driven so as to rotate in the opposite direction, the first supporting axle 22 is rotated in a reverse direction via the first ball screw shaft 35, the first female screw member 36 and the first passive lever 29. By this means, since the swinging arm 8 is rotated downwards and the free end supporting axle 27 is moved downwards along the vertical path of travel J, then the vehicle body M is introduced into the processing liquid of the processing liquid tank D by means of the suspended supporting device 9. (The liquid entry postures 1 and 2 shown in FIG. 11)

4) When the vehicle body M approaches the limit of descent, the vehicle body M is returned to a horizontal posture by the posture adjusting device 51, via the suspended supporting device 9. (The immersion posture shown in FIG. 11)

5) When a suitable immersion time has elapsed, the vehicle body M is inclined by the posture adjusting device 51 so that the front portion thereof faces upwards, via the suspended supporting device 9, thereby setting the vehicle body M to a liquid exiting posture. Simultaneously with this, the first supporting axle 22 is rotated by the raising and lowering drive device 34 of the arm drive device 28, and the swinging arm 8 is rotated upwards, in addition to which the movable bearing members 24 are moved and the free end supporting axle 27 on the crank arm 7 is moved upwards along a vertical path of travel J, thereby causing the vehicle body M to be removed from the processing liquid in the processing liquid tank D. (Liquid exiting postures 1 and 2 shown in FIG. 11)

6) If the crank arm 7 approaches the upward rotation limit and the vehicle body M is removed completely from the processing liquid in the processing liquid tank D, then the front portion of the vehicle body M is inclined downwards by the posture adjusting device 51, via the suspended supporting device 9, and the vehicle body M is thus returned to a horizontal conveyance posture.

According to the first embodiment described above, since the raising and lowering device 6 is provided with a crank arm 7 supported on the second supporting axle 25, and a swinging arm 8 coupled to an intermediate position of the crank arm 7, thereby forming a crank mechanism in the conveyance truck 1 whereby the movable bearing member 24 is able to move towards and away from the fixed bearing member 21, then the free end supporting axle 27 of the crank arm 7 can be lowered and raised along a vertical path of travel J in an approximately vertical direction. Therefore, by means of the aforementioned crank mechanism, the suspended supporting device 9 which is supported on the crank arm 7 by means of the free end supporting axle 27 is lowered and raised following an approximately vertical direction, and hence the position of the vehicle body M can be controlled readily, and it is possible to execute the lowering and raising operations for carrying out the coating process by means of more simple control procedures.

Moreover, since the arm drive device 28 of the conveyance truck 1 comprises a first linear drive device 31 for pushing and pulling the first passive lever 29, then it is possible to cause the crank arm 7 to rotate satisfactorily via the swinging arm 8, by means of a simple structure.

Furthermore, since the suspended supporting device 9 couples the inclining movement of the upper beam 43 with the inclining movement of the coupling beams 46 by means of a parallel link mechanism, when the suspended supporting device 9 is rotated about the free end supporting axle 27, then it is possible to reduce the distance moved by the vehicle body M in the direction of conveyance during adjustment of the posture of the vehicle body M. Moreover, it is also possible significantly to reduce the turning moment required at the free end supporting axle 27 in order to adjust the posture.

Furthermore, since the suspended frames 45 are formed in an L shape when viewed from the front, without forming any obstacle above the vehicle body M, then it is possible to incline the vehicle body M to a large angle. Consequently, it is possible to increase the range of tolerance in the control of the posture of the vehicle body M. Moreover, even when the vehicle body M is introduced into or removed from the holding tools 11 of the suspended frames 45, it is possible to use a sufficiently large raising and lowering stroke in the vertical direction, and hence the introduction and removal operations can be carried out readily and swiftly.

Furthermore, since the truck main body 5 is provided with a self-propelled travel device, it is possible to control the positions and speeds of respective conveyance trucks 1 in a simple manner.

(Second Embodiment)

A second embodiment of a coating line apparatus relating to the present invention is now described with reference to FIG. 14 to FIG. 20. In this second embodiment, in comparison with the first embodiment, changes are made with respect to the first linear drive device 31 of the arm drive device 28 in the crank type raising and lowering device 6 of the first embodiment, the second linear drive device 54 of the posture adjusting device 51, the raising and lowering assistance device 38 of the arm drive device 28, and the travel device, and furthermore, the truck main body 5 is formed to a lower height. Members which are the same as those of the first embodiment are labeled with the same reference numerals and description thereof is omitted here.

As shown in FIG. 14 to FIG. 18, a fixed beam platform 100 supporting a first supporting axle 22 via a fixed bearing member 21, and a movable beam platform 101 disposed movably in the forward and rearward direction (the direction of travel) via guide rails 23, 23A, are provided on the truck main body 5. The second supporting axle 25 is supported rotatably on a supporting pillar section 101a of the movable beam platform 101, via a movable bearing member 24. The first supporting axle 22 and the second supporting axle 25 are disposed mutually in parallel in the same horizontal plane at a prescribed height from the truck main body 5. A pair of circular plate-shaped dividing plates 102 disposed respectively on either side of the insertion space Pa of the cover plate P are attached to one end of the first supporting axle 22 and the second supporting axle 25.

Figure 17:
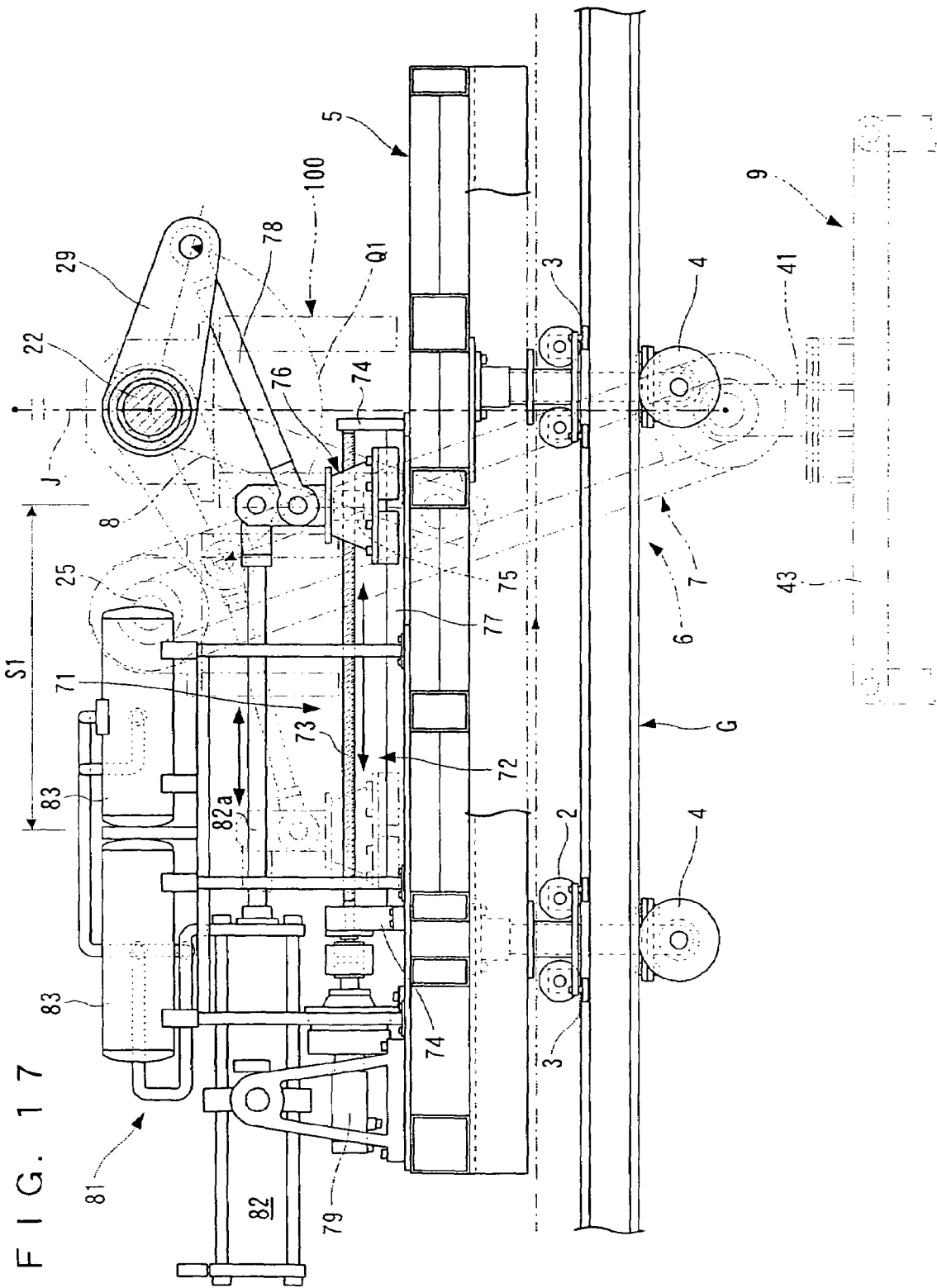
FIG. 17 is a cross-section taken along II—II in FIG. 15.

As shown in FIG. 17, the arm drive device 71 of the crank type raising and lowering device 6 is constituted by a first passive lever 29 for raising and lowering that is fixed to the first supporting axle 22 of the fixed beam platform 100, a screw-type first linear drive device 72 that causes the first passive lever 29 to rotate, and a pressure accumulator type raising and lowering assistance device 81.

More specifically, the first linear drive device 72 is constituted by a first ball screw shaft 73, a first movable body 76, a first intermediate link bar 78, a raising and lowering drive device 79, and the like. The free end portion of the first passive lever 29 is coupled via the first female screw member 75 to the first ball screw shaft 73 which is driven in rotation by the raising and lowering drive device 79.

The first ball screw shaft 73 is disposed horizontally in the forward/rearward direction, between bearing members 74, 74 which are installed on the other side section of the truck main body 5 (the side opposite to that of the processing liquid tank D) in front and rear positions in the direction of travel.

The first movable body 76 is guided movably by guide rails 77 provided on top of the truck main body 5, and comprises a female screw member 75 which screws into the first ball screw shaft 73.

The first intermediate link bar 78 is coupled between the free end portion of the first passive lever 29 and the first movable body 76, rotatably via a horizontal pin.

The raising and lowering drive device 79 is coupled to the rear end portion of the first ball screw shaft 73 and drives the first ball screw shaft 73 in rotation.

Figure 19:
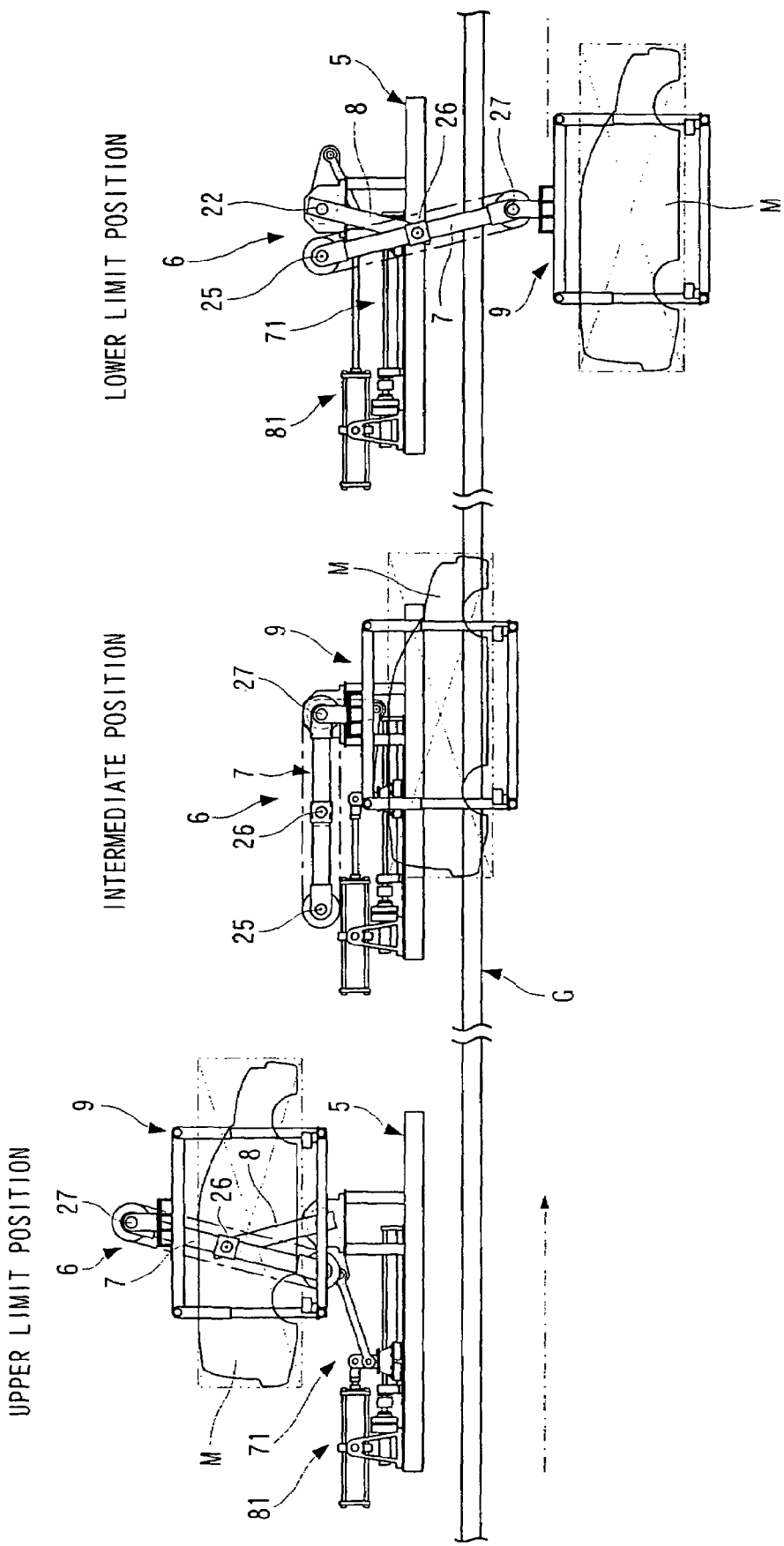
FIG. 19A is a side view showing an operation of a raising and lowering device.
FIG. 19B is a side view showing an operation of the raising and lowering device.
FIG. 19C is a side view showing an operation of the raising and lowering device.

Here, when the first ball screw shaft 73 is rotated by the raising and lowering drive device 79, the first movable body 76 is caused to move reciprocally within a range of the stroke S1 in the forward/rearward direction, via the female screw member 75, and the first passive lever 29 is caused to rotate reciprocally in the range Q1 as indicated by the solid line and dotted line, via the first intermediate link bar 78 which is coupled to the first movable body 76. By this means, as shown in FIG. 19, in the conveyance truck 1, the swinging arm 8 is rotated through a prescribed range via the first supporting axle 22, the crank arm 7 is rotated, the free end supporting axle 27 is moved between an upper limit position and a lower limit position along the vertical path of travel J, and the suspended supporting device 9 can thus be raised and lowered.

The raising and lowering assistance device 81 is constituted by an pneumatic urging cylinder 82, the piston rod 82a of which is coupled to the first movable body 76, and a pressure accumulator tank (pressure accumulator) 83 which supplies air at a prescribed pressure to the urging cylinder 82. More specifically, as shown in FIG. 20, an air supply pipe 84 connected to the pressure accumulator tank 83 is connected to the contraction chamber 82c of the urging cylinder 82, while the extension chamber 82b is open to the atmosphere, via a sound damping device. Furthermore, a pressure accumulator replenishment pipe 85 for replenishing air from a port 85a and via a non-reversing valve is connected to the pressure accumulator tank 83. In the exhaust pipe 86 connected to the pressure accumulator replenishment pipe 85, there are provided a pressure gauge 87 for detecting the air pressure of the pressure accumulator tank 83, a safety valve 88 for holding the air pressure of the pressure accumulator tank 83 at a prescribed value, and a sound damper. If the air pressure in the pressure accumulator tank 83 becomes equal to or less than a prescribed pressure, then air is replenished into the pressure accumulator tank 83 via the port 85a, from an air supply unit (not illustrated), at a stock entry and exit position K, for example. Therefore, the first passive lever 29 is caused to swing via the urging cylinder 82, the first movable body 76 and the first intermediate link bar 78, due to the air pressure of the pressure accumulator tank 83, and hence the suspended supporting device 9 is urged in an upward direction.

Figure 16:
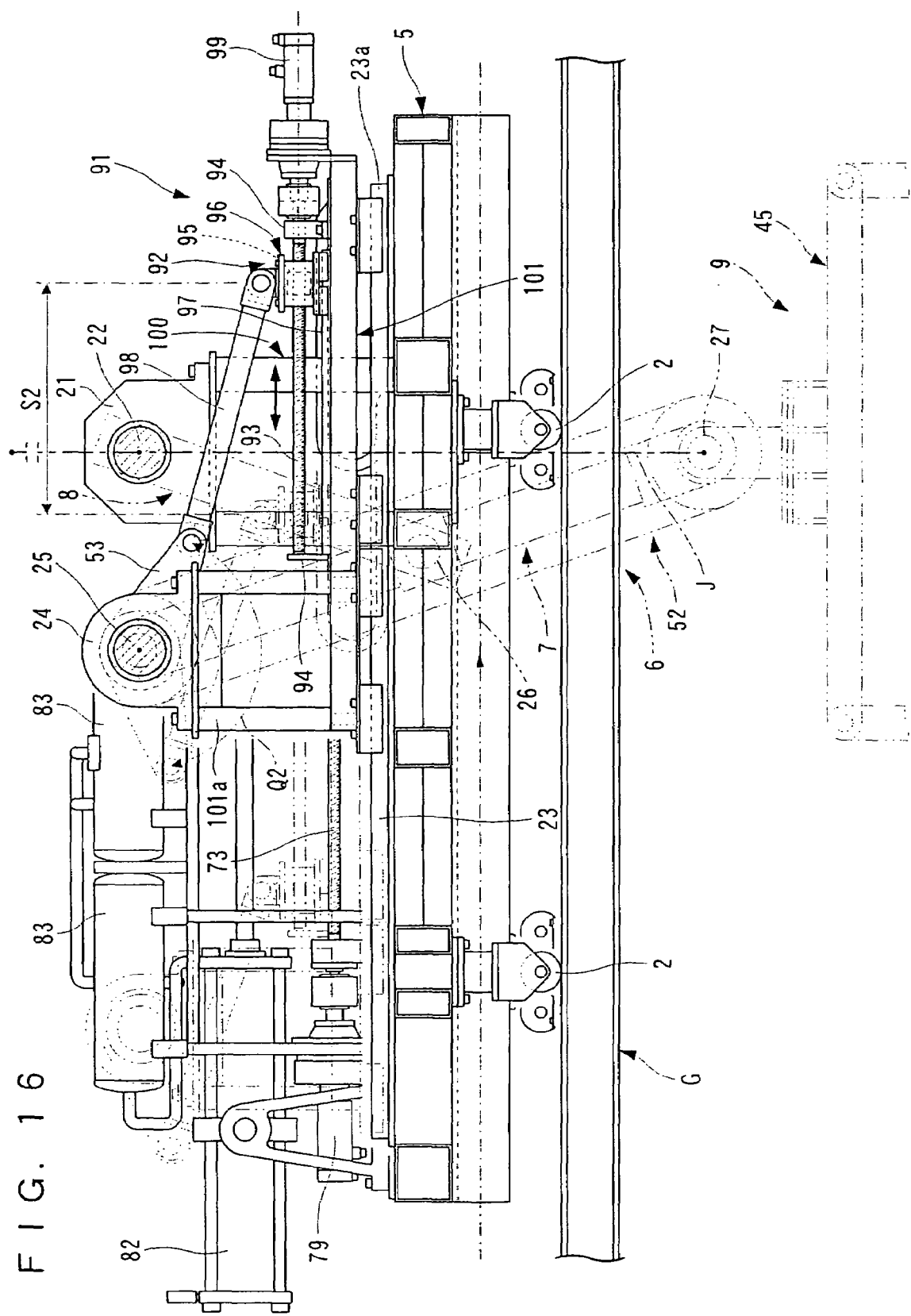
FIG. 16 is a cross-section taken along I—I in FIG. 15.

As shown in FIG. 16, the posture adjusting device 91 disposed on the movable beam platform 101 is constituted by a second passive lever 53 provided in a projecting manner from the second supporting axle 25, a second linear drive device 92 which causes the second passive lever 53 to rotate, and a transmission device 52 for posture adjustment installed on the crank arm 7. The posture adjusting device 91 is able to adjust a vehicle body M held by the suspended frames 45 of the suspended supporting device 9 to a forward tilting posture, a horizontal posture or a rearward tilting posture.

The second linear drive device 92 is constituted by a second ball screw shaft 93, a second movable body 96, a second intermediate link bar 98, a posture adjustment drive device 99, and the like, and the free end portion of the second passive lever 53 is coupled via a second female screw member 95 to the second ball screw shaft 93 which is driven in rotation by the posture adjustment drive device 99.

The second ball screw shaft 93 is disposed horizontally in the direction of travel of the second supporting axle 25, between bearing members 94, 94 installed on one side (the processing liquid tank D side) of the truck main body 5.

The second movable body 96 is guided movably by the guide rails 97 on the movable beam platform 101, and it comprises the female screw member 95 which screws together with the second ball screw shaft 93.

The second intermediate link bar 98 is coupled rotatably via a horizontal pin between the free end portion of the second passive lever 53 and the second movable body 96.

The posture adjustment drive device 99 is coupled to the rear end portion of the second ball screw shaft 93.

Here, if the second ball screw shaft 93 is rotated by the posture adjustment drive device 99, then the second movable body 96 moves in the forward and rearward direction within the range of S2 indicated by the solid line and the dotted line, by means of the female screw member 95, the second passive lever 53 swings in the range of Q2 via the first intermediate link bar 98 coupled to the second movable body 96, and the second supporting axle 25 is rotated.

Figure 18:
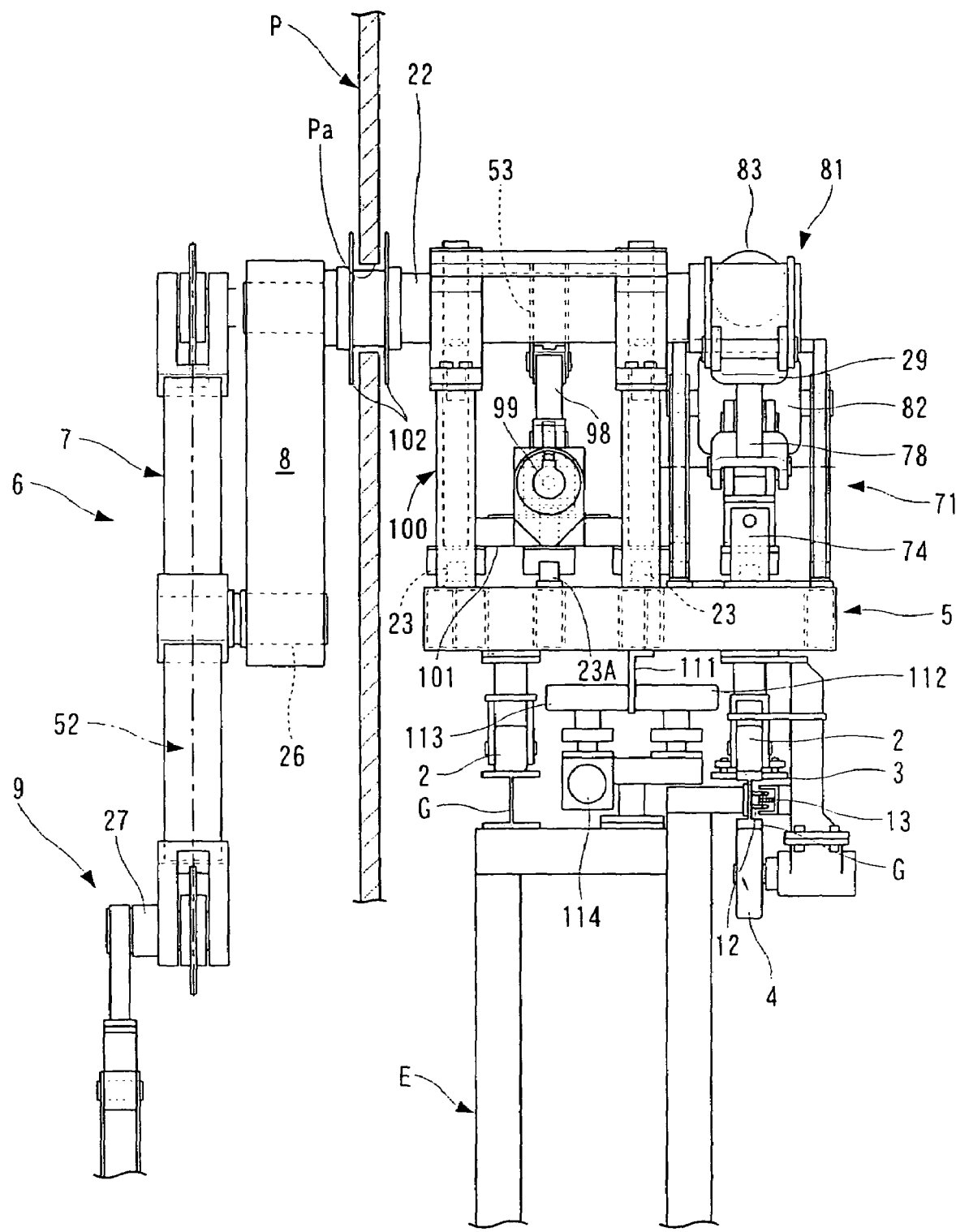
FIG. 18 is a front view of the conveyance truck.

Furthermore, as illustrated in FIG. 18, in the second embodiment, a passive travel device is used as the travel device for the conveyance truck 1. More specifically, a friction plate (friction section) 111 is suspended on the lower portion of the truck main body 5 in line with the direction of travel, an idle pressure roller 112 and a driven pressure roller 113 are provided at prescribed intervals along the travel rails G, and electrical rotational drive devices 114 for causing travel (roller drive devices) which cause the driven pressure rollers 113 to rotate are also provided. By this means, each of the conveyance trucks 1 can be reduced in weight and simplified, thus making a contribution towards reducing costs.

The operation of the coating line having the aforementioned composition is similarly to that of the first embodiment, and therefore description thereof is omitted here.

According to the aforementioned composition, in comparison with the first embodiment, since the ball screw shafts 73 and 93 of the first and second linear drive devices 72 and 92 of the crank type raising and lowering device 6 and the posture adjusting device 51 are disposed respectively in a horizontal direction, then it is possible to form the conveyance truck 1 to a lower overall height, and hence the height of the room for the coating line apparatus can be reduced. Furthermore, since a composition is adopted wherein the raising and lowering assistance device 81 uses high-pressure air supplied from the pressure accumulator tank 83 to urge the first movable body 76 in a rearward direction by means of the urging cylinder 82, in such a manner that the crank arm 7 is urged so as to rotate upwards by means of a uniform driving force, then a compact composition can be achieved. Furthermore, by taking the safety valve 88 to be an adjusting valve capable of adjusting the pressure and changing the air pressure inside the pressure accumulator tank 83 in accordance with the weight of the vehicle body M, it is possible to achieve a smoother raising and lowering operation.

(Third Embodiment)

In the first and second embodiments described above, a suspended supporting device 9 having a parallel link mechanism is provided, but in the third embodiment, a suspended supporting device 121 having an inverted trapezoid shaped link mechanism is provided. This device will be described with reference to FIG. 21 to FIG. 22.

In the previous parallel link mechanism, the upper beam 43 and the coupling beams (lower beams) 46 are always disposed mutually in parallel, and the angle of inclination of the upper beam 43, when caused to tilt by the posture adjusting device 51, and the angle of inclination of the coupling beams 46 (vehicle body M) are always the same. In this case, if an external force from a cam roller 131 and a cam rail 132 (described hereinafter), or a cylinder device or the like, were to act so as to deform the parallel link, then since the angles of inclination of the upper beam 43 and the coupling beams 46 are the same, it would not be possible to adjust the posture of the vehicle body M.

However, if the suspended supporting device 121 having an inverted trapezoid link mechanism is used, then the angle of inclination $\theta d$ of the coupling beam 126 (vehicle body M) can be made greater than the angle $\theta u$ of the upper beam, which is caused to tilt by the posture adjusting device 51, and hence the angle of inclination of the upper beam 123 which is adjusted by the posture adjusting device 51 can be reduced. Therefore, if the suspended supporting device 121 is caused to deform by applying an external force, it is possible to adjust the posture of the vehicle body M by causing the coupling beam 126 to tilt, even if the upper beam 123 is held in a fixed position.

Figure 21A:
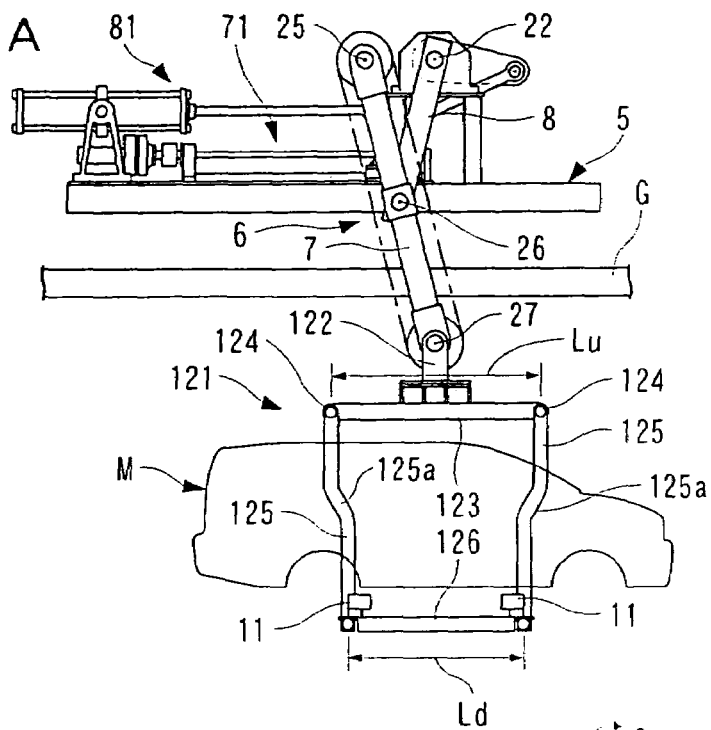
FIG. 21A is a side view illustrating a posture adjustment operation of a suspended supporting device in a coating line apparatus (conveyance apparatus) according to a third embodiment of the invention.

As shown in FIG. 21A, the suspended supporting device 121 comprises an upper beam 123, suspended frames 125, 125, and a coupling beam (lower beam) 126.

The free end portion of a crank arm 7 is coupled rotatably via a free supporting axle 27 to the central portion of the upper beam 123.

The suspended frames 125 and 125 are respectively suspended rotatably via suspending pins 124 and 124, from either end portion of the upper beam 123. Furthermore, the suspended frames 125 are each formed with a step section 125a bending towards the inner side in the central region thereof, and thus form an inverted trapezoid shaped link mechanism wherein the length Ld of the coupling beam 126 between the coupling sections of the suspended frames 125 is shorter than the length Lu of the upper beam 123 between the suspending pins 124, 124.

The end portions of the coupling beam 126 are respectively coupled rotatably to the lower portions of the front and rear side suspended frames 125. Furthermore, similarly to the first and second embodiments described previously, holding tools 11 are provided on the coupling beam 126, and an L-shaped form, when viewed from the front, is created by means of a vertical section and a horizontal supporting section.

Figure 21B:
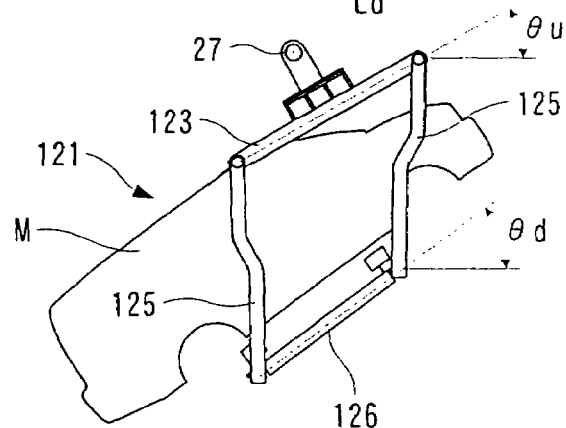
FIG. 21B is a side view showing a posture adjustment operation of the suspended supporting device.
Figure 21C:
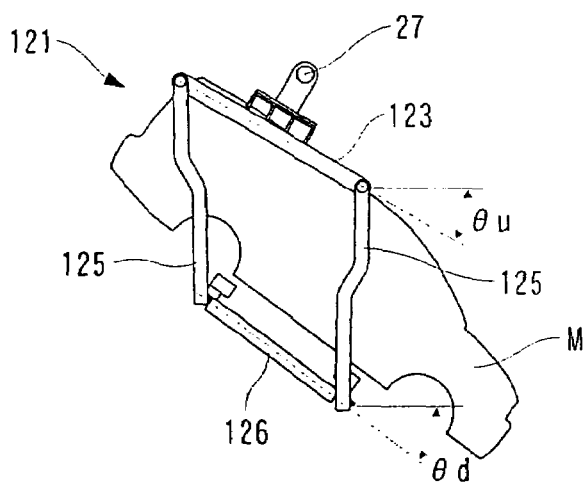
FIG. 21C is a side view showing a posture adjustment operation of the suspended supporting device.

Therefore, as shown in FIGS. 21B and 21C, when the suspending member 122 is caused to rotate by the posture adjusting device 51 via the free supporting axle 27, thereby causing the upper beam 123 to tilt to an angle of inclination of $\theta u$, then due to the inverted trapezoid link mechanism, the coupling beam 126 is tilted by an angle of inclination $\theta d$ that is greater than the angle of inclination $\theta u$, and hence the vehicle body M can be inclined to a large degree.

Moreover, as shown in FIG. 22, if a cam roller 131 is provided on the suspended frames 125, 125 or the coupling beam 126 of the suspended supporting device 121, and a cam rail 132 against which the cam roller 131 abuts is provided externally, for instance, at the edge of the processing liquid tank D, thereby applying external pressure to the suspended supporting device 121, then the suspended supporting device 121, which has an inverted trapezoid shaped link mechanism, is caused to deform and hence the vehicle body M can be set to an inclined posture. Consequently, it is possible to adjust the posture of the vehicle body M when the conveyance truck 1 is at a prescribed position, without operating the posture adjusting device 51.

In the embodiment described above, the linear drive devices 31, 54, 72 and 92 respectively use screw shaft mechanisms, but the invention is not limited to this and cylinder mechanisms, or rack and pinion mechanisms may also be employed.

(Fourth Embodiment)

A fourth embodiment of a coating line apparatus relating to the present invention is now described with reference to FIG. 23 to FIG. 28. In this fourth embodiment, the arm drive devices 28 and 71 of the raising and lowering device 6 in the previous embodiments, and the posture adjusting devices 51 and 91 are modified, being composed so as to be particularly suitable for a small and light-weight vehicle body M. Therefore, the truck main body 5 can be formed to a compact size. Members which are the same as those in the first to third embodiments are labeled with similar reference numerals and description thereof is omitted here.

As shown in FIG. 23 to FIG. 26, a hollow first supporting axle 201 supported rotatably via fixed bearing members 21 is disposed in a lateral direction on a fixed beam platform 100 provided on the front portion of a truck main body 5 with respect to the direction of travel. Furthermore, a movable beam platform 101 is disposed movably in the forward and rearward direction (the direction of travel), via guide rails 23, on the rear portion of the truck main body 5 with respect to the direction of travel. A hollow second supporting axle 202 supported rotatably via movable bearing members 24 is disposed in a lateral direction on the movable bearing platform 101.

Figure 25:
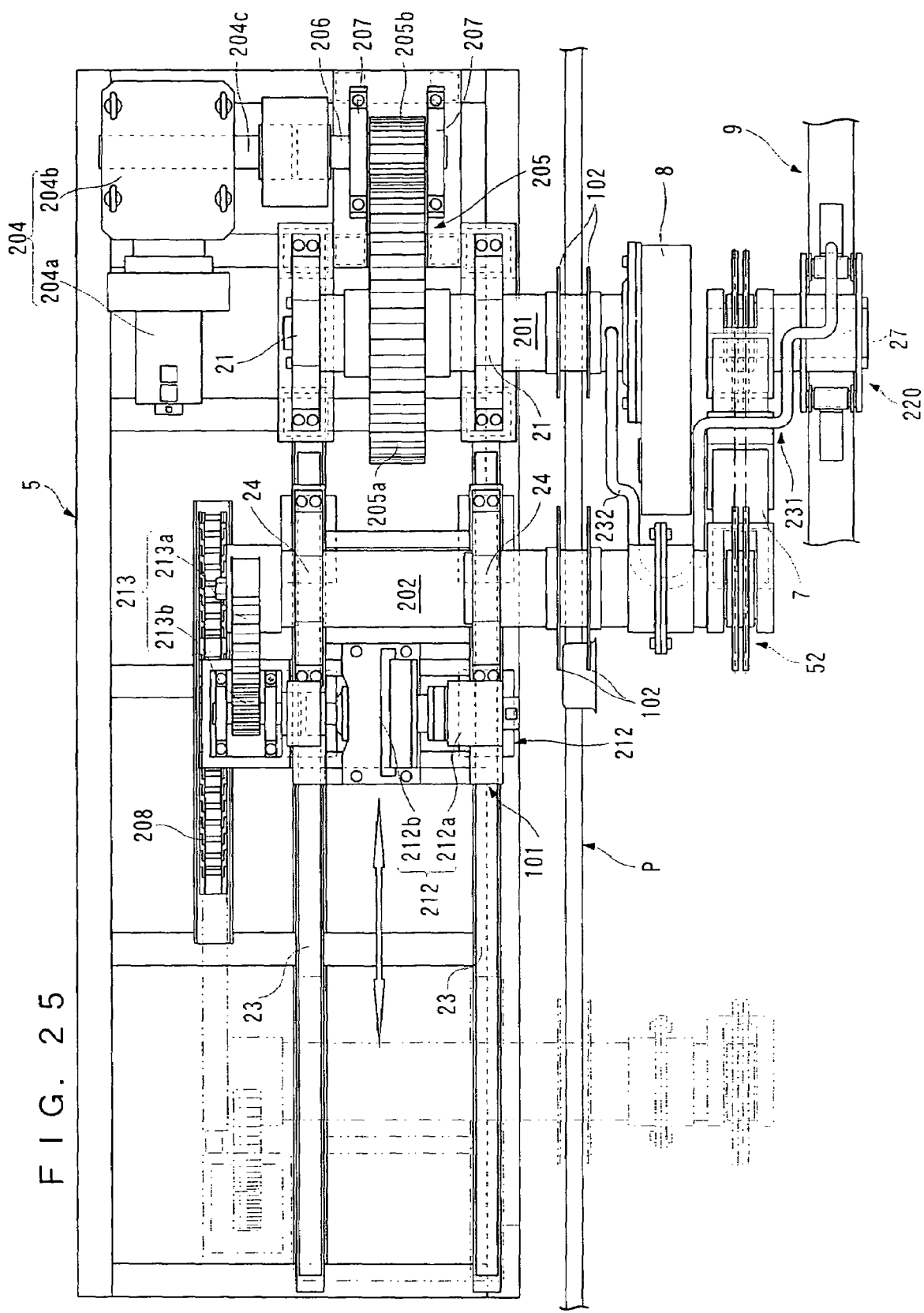
FIG. 25 is a plan view of the conveyance truck.
Figure 26:
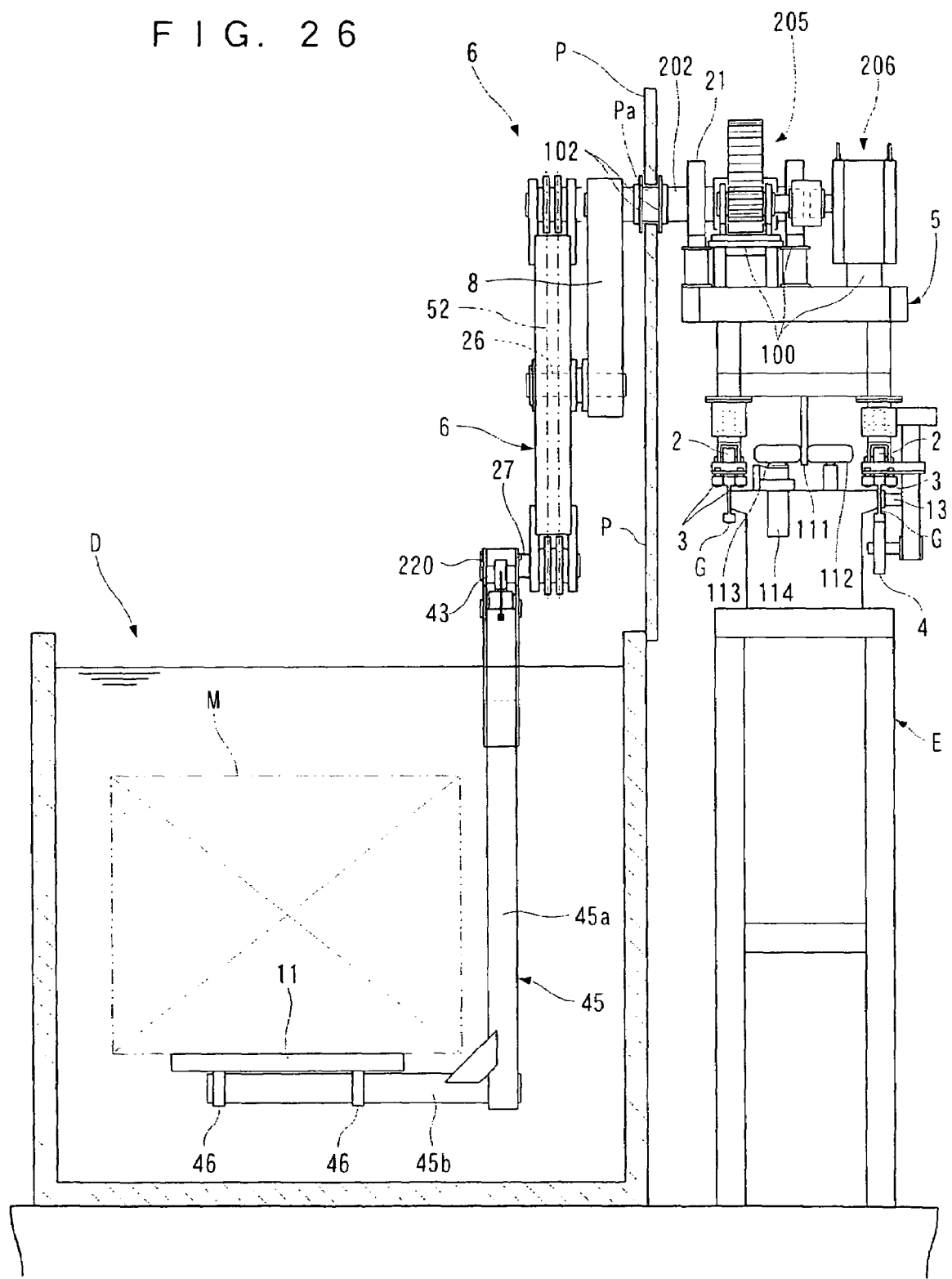
FIG. 26 is a front view of the conveyance truck.
Figure 27:
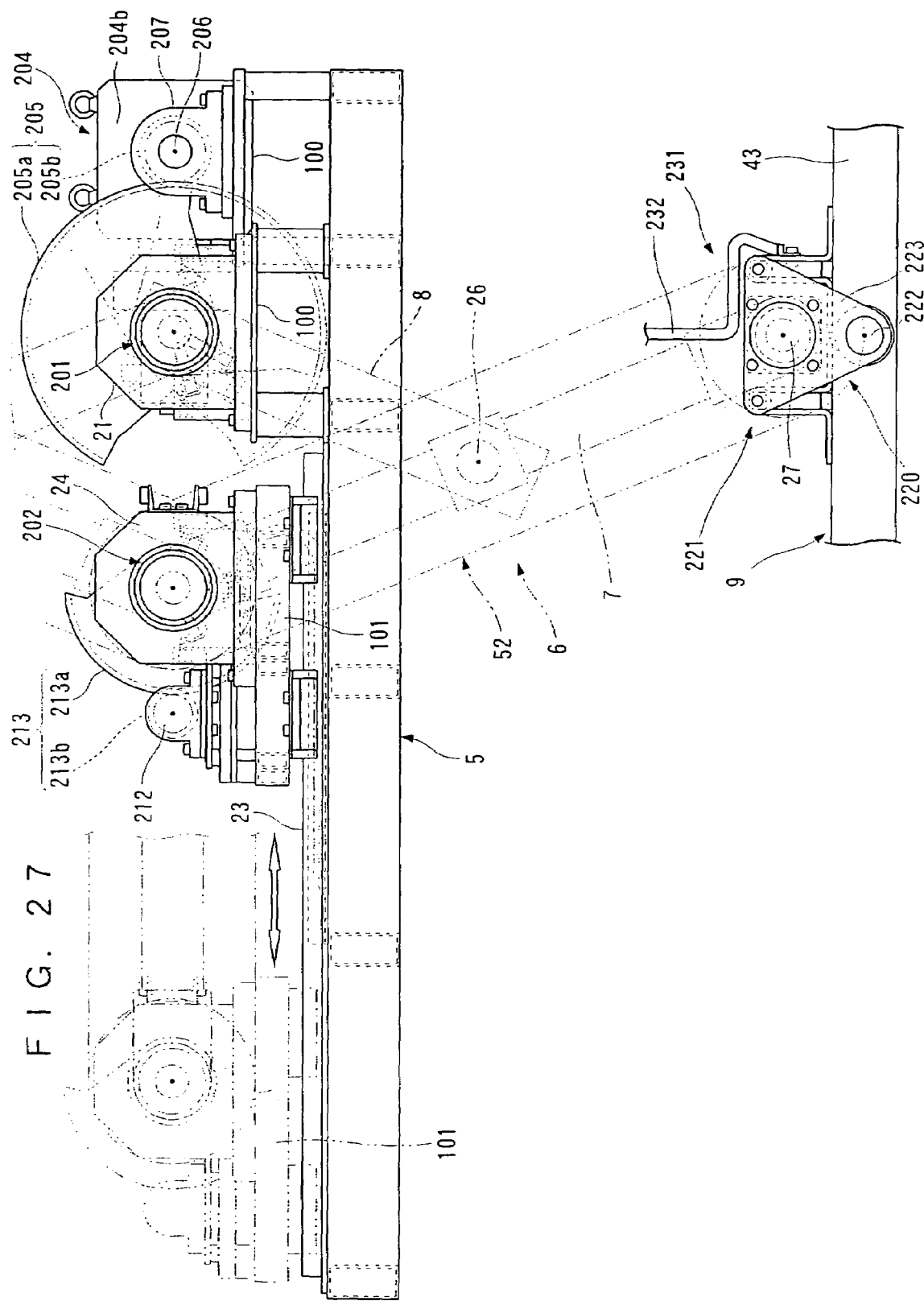
FIG. 27 is a side view showing an arm drive device and a posture adjusting device in the conveyance truck.
Figure 28:
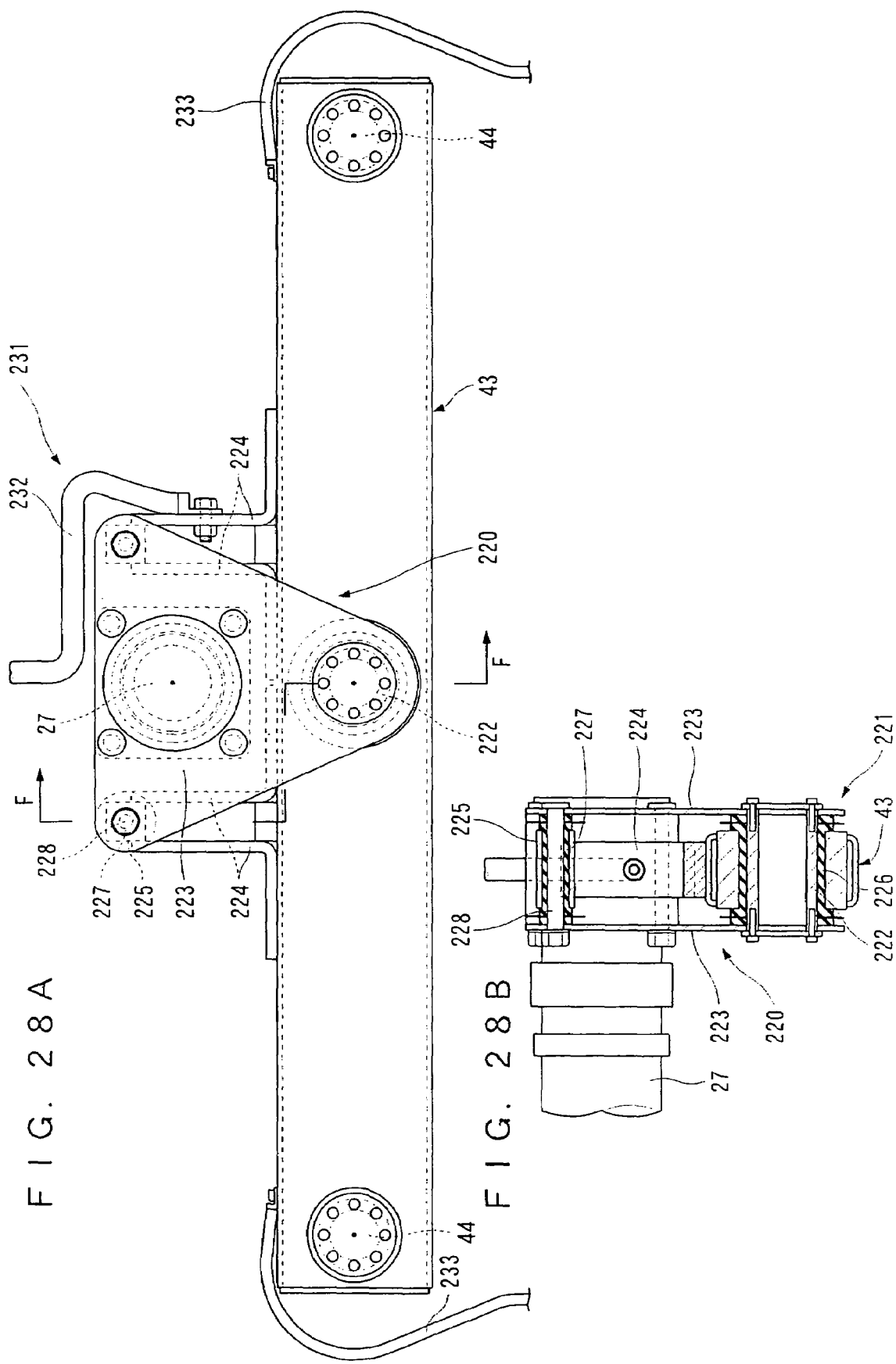
FIG. 28A is a side view showing an insulating structure section for the crank arm and the suspended supporting device.
FIG. 28B is cross-section taken along F—F in FIG. 28A.

In the arm drive device 203 for raising or lowering the vehicle body M, the first supporting axle 201 is coupled to the output axle of a rotational drive device (electric motor 204a and reducing gear device 204b) 204 by means of a raising and lowering transmission gear device 205, which is a mechanical transmission device. More specifically, a swinging arm 8 is fixed to one end (the end on the processing liquid tank D side) of the first supporting axle 201, and a passive gear 205a is fixed to an intermediate portion of the first supporting axle 201. Furthermore, an intermediate drive axle 206 that is parallel to the first supporting axle 201 is provided on top of the fixed beam platform 100, via a bearing member 207, and the intermediate drive axle 206 is coupled to the drive of the output axle of the aforementioned rotational drive device 204 that is provided on the fixed beam platform 100. A drive pinion 205b that meshes with the passive gear 205a is fixed to the intermediate drive axle 206, and the raising and lowering transmission gear device 205 is constituted by this passive gear 205a and drive pinion 205b. In this case, since the passive gear 205a moves back and forth reciprocally within a prescribed range (of 180° or less), it is formed in a fan shape in order to reduce weight. In FIG. 25, numeral 208 denotes a cable pair accommodating a power cable and a power cable, provided on the movable beam platform 101.

A posture adjustment drive device (electric motor 212a and reducing gear device 212b) 212 is provided in the movable beam platform 101 of the posture adjusting device 211 which alters the posture of the vehicle body M, and in this posture adjusting device 211, a second supporting axle 202 is coupled to an intermediate drive axle 214 that is coupled in turn to the output axle of the posture adjustment drive device 212, by means of a transmission gear device 213 for posture adjustment, which is a mechanical transmission device. A crank arm 7 is fixed to one end (the end on the processing liquid tank D side) of this second supporting axle 202, and a passive gear 213a of the transmission gear device 213 for posture adjustment is fixed to the other end thereof. A drive pinion 213b that meshes with this passive gear 213a is fixed to and coupled to the movement of the intermediate drive axle 214. Here, since the passive gear 213a moves back and forth reciprocally within a prescribed range, it is formed in a fan shape in order to reduce weight.

A coating electrode (not illustrated) is provided inside the processing liquid tank D for coating, and electrodeposition coating is performed to deposit an even coating on the vehicle body M, by using the potential difference between the coating electrode and the vehicle body M. Accordingly, there are provided an electrical conduction device 231 for conducting electricity to the vehicle body M via the suspended supporting device 9, and an insulating structure section 221 for insulating the crank arm 7 and the suspended supporting device 9.

The insulating structure section 221 for the crank arm 7 and suspended supporting device 9 will now be described with reference to FIGS. 28A and 28B. A suspended member 220 is installed in the central portion of the upper beam 43, and the free end portion of the crank arm 7 is supported rotatably via a free end supporting axle 27 on this suspended member 220. The suspended member 220 consists of a pair of suspended plates 223 disposed in a lateral direction, which have an inverted triangular shape and are coupled to the upper beam 43 by means of a suspending support pin 222, and a pair of sets of two angle-shaped coupling plates 224 disposed between these suspended plates 223, respectively on the front and rear sides in the direction of travel. The free end supporting axle 27 is coupled and fixed by coupling bolts to the upper central portion of the left and right-hand suspended plates 223. Furthermore, coupling bolts 228 are coupled and fixed respectively to the left and right-hand suspended plates 223, to the front and rear sides of the free end supporting axle 27, and the upper end portions of the pair of coupling plates 224 are coupled and fixed to a square cylindrical body 225 which projects rotatably from the respective coupling plates 224, on the front and rear sides in the direction of travel. The insulating structure 221 is constituted by a first insulating tube 226 which is fitted between the upper beam 43 and the suspending support pin 222, and a second insulating tube 227 which is fitted between the coupling bolts 228 and the square cylindrical bodies 225. By means of this insulating structure 221, the suspended supporting device 9 is supported reliably on the crank arm 7, and the crank arm 7 and the suspended supporting device 9 are insulated satisfactorily.

Figure 23:
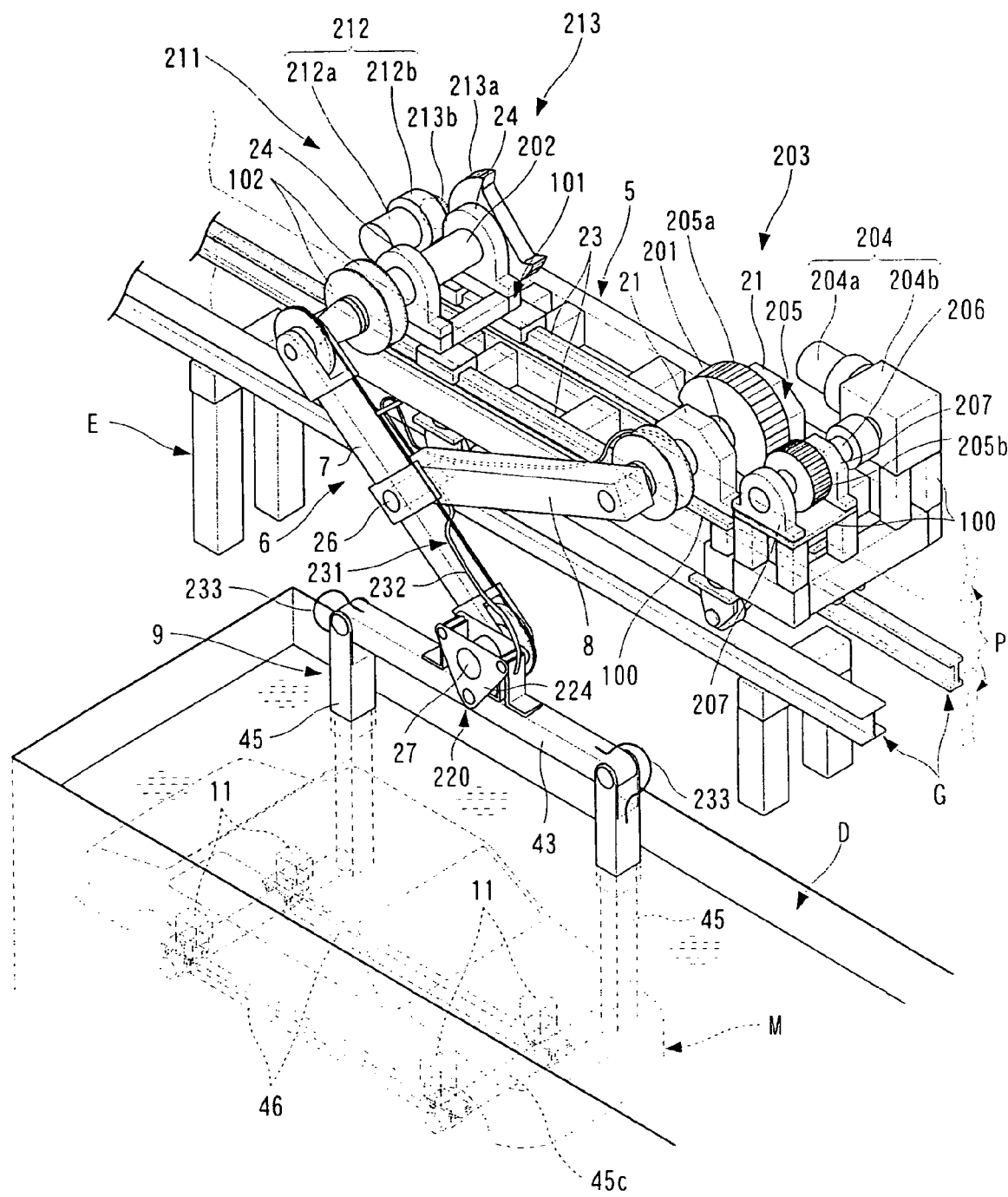
FIG. 23 is a perspective view showing a coating line apparatus according to a fourth embodiment of the present invention.
Figure 24:
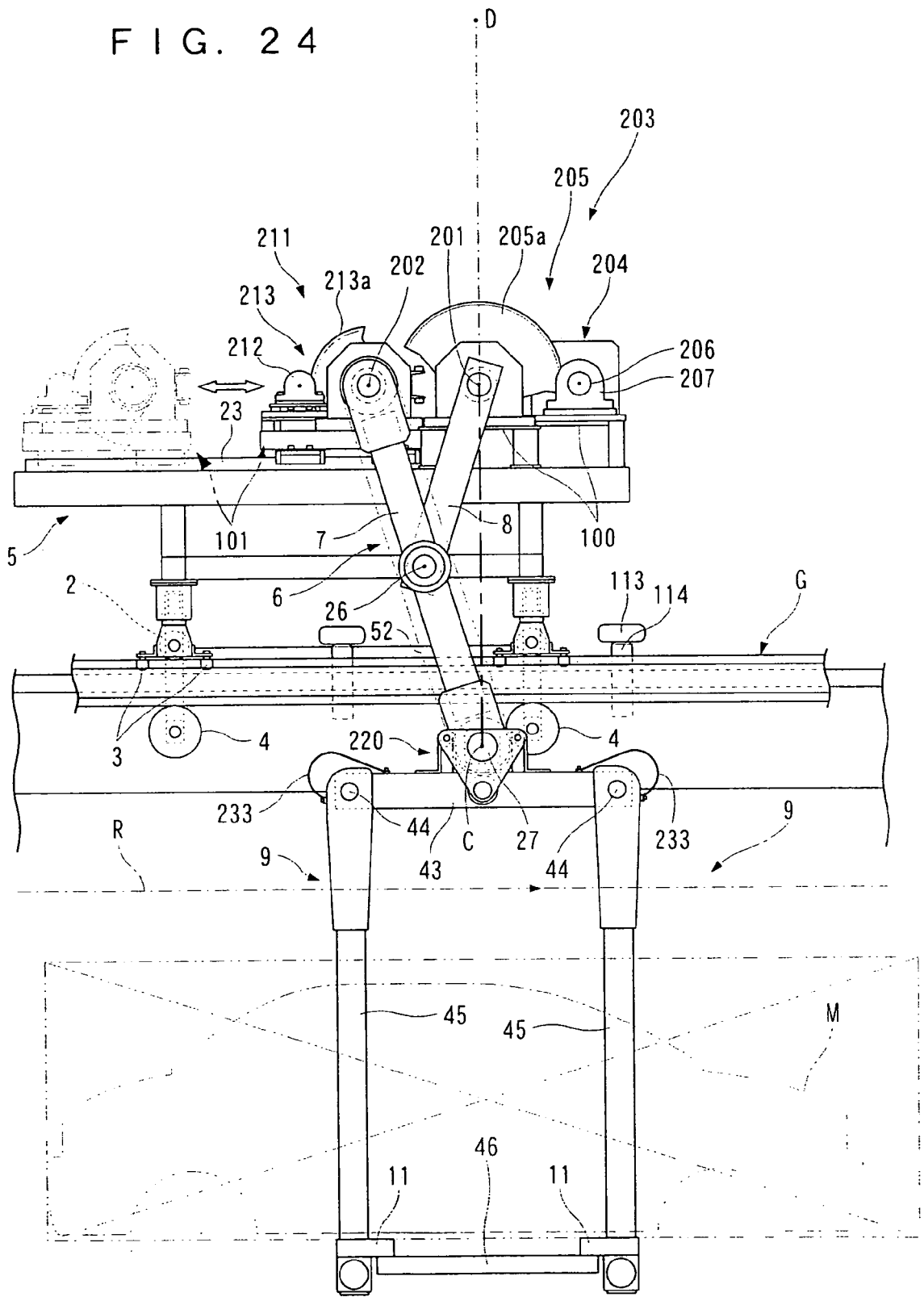
FIG. 24 is a side view of the conveyance truck.

The electrical conduction device 231 is equipped with a main conduction cable 232 and a subsidiary conduction cable 233. As shown in FIG. 23 and FIG. 25, the main conduction cable 232, which is connected to an electrical conduction device (not illustrated) of the conveyance truck 1, is channeled through the hollow portion of the first supporting axle 201 and is connected to one of the coupling plates 224 by passing along the swinging arm 8 and the crank arm 7. By this means, electricity is conducted to the suspended supporting device 9, which maintains a negative electric potential, for example. The subsidiary conduction cable 233 is connected by passing around the moving portion between the upper beam 43 and the vertical section 45a of the suspended frame 45, and it ensures satisfactory conductivity. Furthermore, the suspended supporting device 9 and the vehicle body M are electrically connected by means of the holding tools 11.

According to the fourth embodiment described above, in the arm drive device 203 for raising and lowering the vehicle body M, the first supporting axle 201 is coupled to the output axle of the rotational drive device 204 by means of a transmission gear device 205 for raising and lowering. Furthermore, in the posture adjusting device 211 for changing the posture of the vehicle body M, the second supporting axle 202 is coupled via a transmission gear device 213 for posture adjustment to the output shaft of the posture adjustment drive device 212. Therefore, in comparison with the arm drive device 28 having the first linear drive devices 31, 72 and the posture adjustment drive device 58 having the second linear drive devices 54, 92, as described in the first to third embodiments, in this fourth embodiment, the number of components can be reduced significantly, the length, width and height of the truck main body 5 can be reduced considerably, and the overall weight and size of the conveyance truck 1 can be reduced. Furthermore, since the structure is simplified, it is possible to lessen manufacturing costs and maintenance costs.

Furthermore, since the suspended supporting device 9 is insulated satisfactorily by the insulating structure section 221 between the crank arm 7 and the suspended supporting device 9, and since a satisfactory electrical connection is made from the electrical connection device 131 to the vehicle body M by means of the suspended supporting device 9, thereby maintaining the vehicle body M at an electrical potential, then it is possible to carry out electrodeposition coating in an efficient manner.

(Modification of the Fourth Embodiment)

Figure 29:
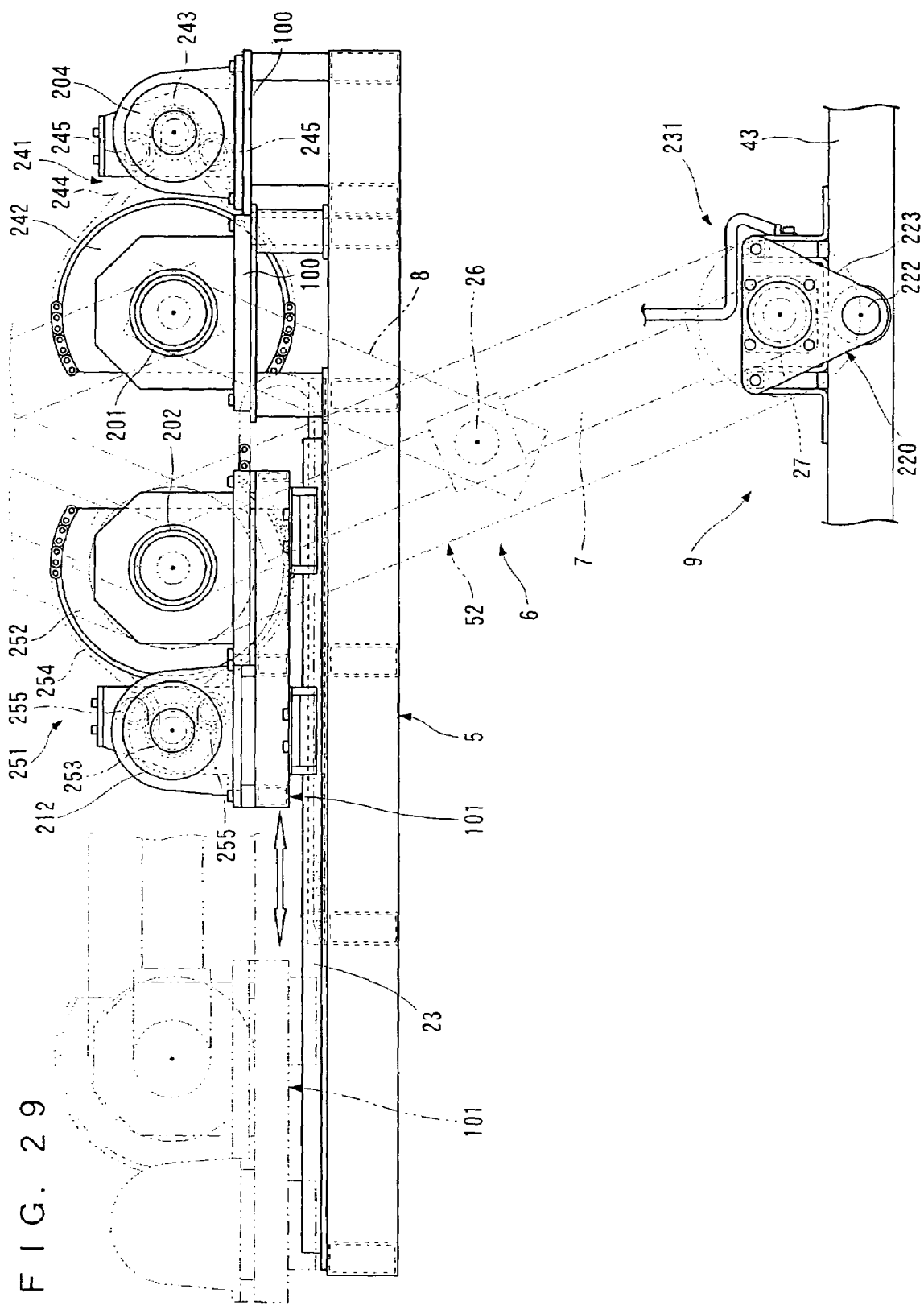
FIG. 29 is a side view of an arm drive device and a posture adjusting device in the coating line apparatus (conveyance apparatus) according to a modification of the fourth embodiment.
Figure 30:
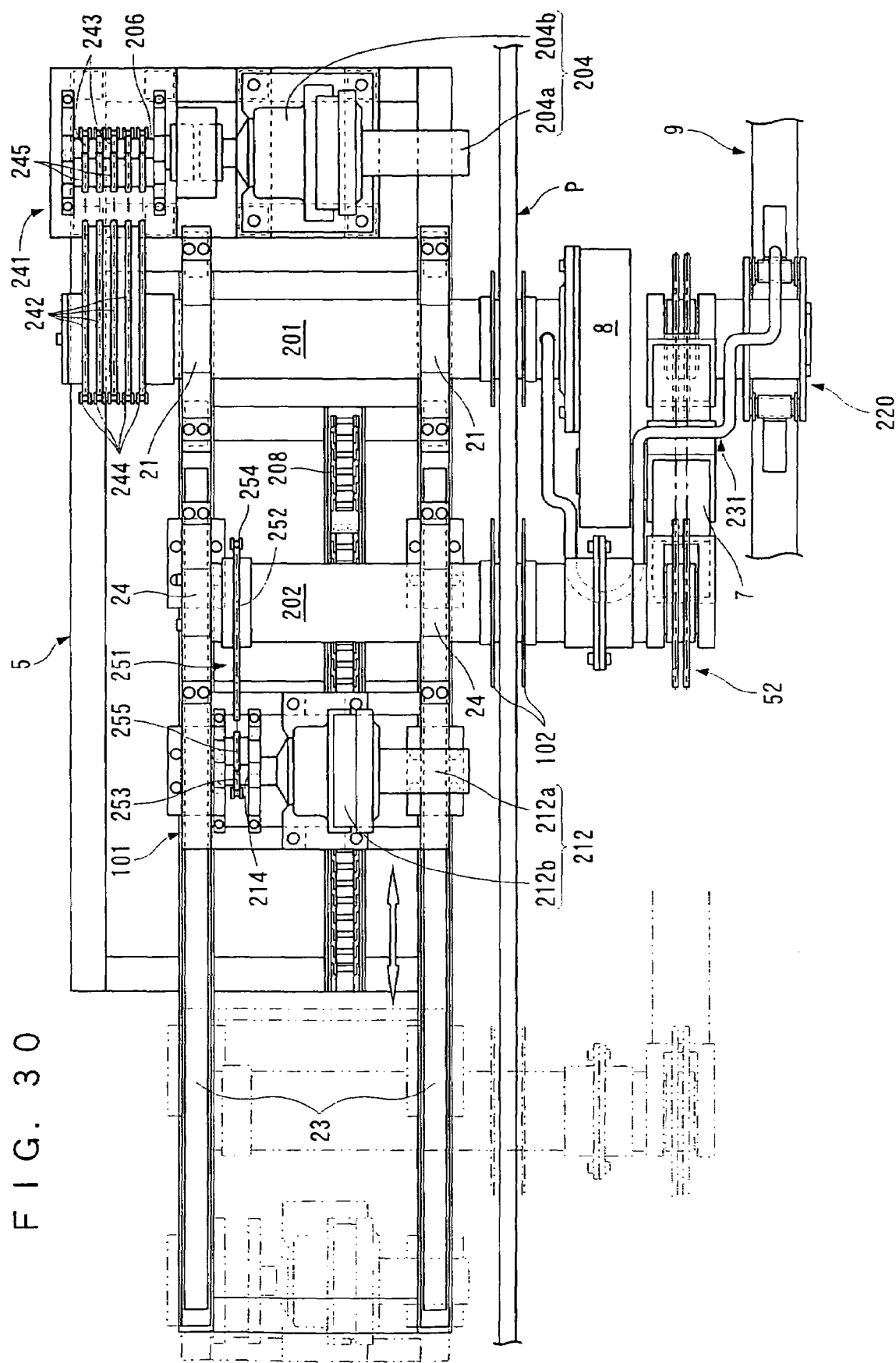
FIG. 30 is a plan view of the arm drive device and the posture adjusting device.

Next, a modification of the arm drive device 203 and the posture adjusting device 211 of the fourth embodiment is described with reference to FIG. 29 and FIG. 30. In the fourth embodiment, a transmission gear device 215 for raising and lowering and a transmission gear device 213 for posture adjustment which are based on gear wheels are used as mechanical transmission devices, but in this modification, a winding transmission device 241 for raising and lowering and a winding transmission device 251 for posture adjustment based on chains are used.

More specifically, the winding transmission device 241 for raising and lowering and the winding transmission device 251 for posture adjustment are constituted by passive sprockets 242, 252, drive sprockets 243, 253 on the intermediate drive axles 206 and 214, drive chains 244, 254, and tensioning sprockets 245, 255.

The passive sprockets 242 and 252 are formed in a fan shape and are fixed respectively to the first supporting axle 201 and the second supporting axle 202.

The drive sprockets 243 and 253 are coupled to the output axles of the rotational drive device 204 and the posture adjustment drive device 212.

The respective ends of the drive chains 244 and 254 are coupled to the respective ends of the toothed portions of the passive sprockets 242 and 252, and they are wound from the passive sprockets 242 and 252 and about the drive sprockets 242 and 252.

The tensioning sprockets 245 and 255 respectively tension the drive chains 244 and 254, between the passive sprockets 242, 252 and the drive sprockets 243 and 253.

Consequently, since the rotational forces of the rotational drive device 204 and the posture adjustment drive device 212 are transmitted respectively to the first supporting axle 201 and the second supporting axle 202, via the drive chains 244 and 254, it is possible to raise or lower the vehicle body M and to adjust the posture of the vehicle body M.

According to this modification example, it is possible to obtain similar actions and beneficial effects as those in the fourth embodiment.

Moreover, in this modification of the fourth embodiment, mechanical transmission devices 205, 213, 241 and 251 are interposed between the output axles of the rotational drive device 204 and the posture adjustment drive device 212, and the first and second supporting axles 201 and 202, but it is also possible to couple the output axles of the rotational drive device 204 and the posture adjustment drive device 212 directly to the first and second supporting axles 201 and 202.

Furthermore, in the respective embodiments described above, the arm drive devices 28 and 71 are composed in such a manner that they cause the first supporting axle 22 to rotate, but it is also possible to drive the second supporting axle 25 as a dual axle for driving the arm and for adjusting the posture. Furthermore, instead of rotational driving of the supporting axles 22 and 25, it is also possible to adopt a structure wherein at least one of the fixed bearing members 21 and/or the movable bearing members 24 are caused to move towards and away from the other, by means of a linear drive device.

What is claimed is:

1. A conveyance apparatus for a processing step in which travel rails are laid along said processing step in which a processing liquid tank is disposed, a movable body is disposed movably on said travel rails for movement in a direction of travel along said travel rails by means of a plurality of wheels, and a conveyed object held on said movable body is immersed into the processing liquid and processed, wherein said movable body comprises:

a suspended supporting device for supporting said conveyed object in such a manner that a posture of said object can be adjusted;

a raising and lowering device for raising and lowering said suspended supporting device with respect to said processing liquid tank; and a posture adjusting device for operating said suspended supporting device and adjusting the posture of said conveyed object, wherein said raising and lowering device comprises:

a first supporting axle disposed in a horizontal direction that is orthogonal to the direction of travel, at one of the front and rear of the movable body in the direction of travel;

a second supporting axle disposed in parallel to said first supporting axle at the other of the front and rear of the movable body in the direction of travel, and being linearly movable towards and away from said first supporting axle;

a crank arm supported rotatably on said second supporting axle and rotatably supporting said suspended supporting device at a free end portion thereof by means of a free end supporting axle;

a swinging arm fixed to said first supporting axle and having a free end portion thereof coupled to an intermediate position of said crank arm by means of a coupling axle; and an arm drive device for causing said crank arm to rotate about said second supporting axle, wherein said posture adjusting device comprises:

a second passive lever fixed to said second supporting axle;

a linear drive device for driving said second passive lever in pushing and pulling action; and a transmission device for coupling together said second supporting axle and said free end supporting axle, wherein said arm drive device comprises:

a first passive lever fixed to said first supporting axle, and a linear drive device for driving said first passive lever in a pushing and pulling action.

2. The conveyance apparatus for a processing step according to claim 1, wherein said arm drive device comprises:

a raising and lowering assistance device for reducing load on said linear drive device, said raising and lowering assistance device including a pneumatic urging cylinder for urging said first supporting axle to rotate in the drive direction by means of said first passive lever, and a pressure accumulator device for supplying air at a prescribed pressure to said urging cylinder.

3. A conveyance apparatus for a processing step in which travel rails are laid along said processing step in which a processing liquid tank is disposed, a movable body is disposed movably on said travel rails for movement in a direction of travel along said travel rails by means of a plurality of wheels, and a conveyed object held on said movable body is immersed into the processing liquid and processed, wherein said movable body comprises:

a suspended supporting device for supporting said conveyed object in such a manner that a posture of said object can be adjusted;

a raising and lowering device for raising and lowering said suspended supporting device with respect to said processing liquid tank; and a posture adjusting device for operating said suspended supporting device and adjusting the posture of said conveyed object, wherein said raising and lowering device comprises:

a first supporting axle disposed in a horizontal direction that is orthogonal to the direction of travel, at one of the front and rear of the movable body in the direction of travel;

a second supporting axle disposed in parallel to said first supporting axle at the other of the front and rear of the movable body in the direction of travel, and being linearly movable towards and away from said first supporting axle;

a crank arm supported rotatably on said second supporting axle and rotatably supporting said suspended supporting device at a free end portion thereof by means of a free end supporting axle;

a swinging arm fixed to said first supporting axle and having a free end portion thereof coupled to an intermediate position of said crank arm by means of a coupling axle; and an arm drive device for causing said crank arm to rotate about said second supporting axle, wherein said posture adjusting device comprises:

a second passive lever fixed to said second supporting axle;

a linear drive device for driving said second passive lever in pushing and pulling action; and a transmission device for coupling together said second supporting axle and said free end supporting axle, wherein said suspended supporting device comprises:

a parallel link mechanism comprising a mutually parallel upper beam and lower beam, and a pair of suspended frame members provided at each front and rear sides in the direction of travel for coupling said upper beam and said lower beam in a rotatable fashion, wherein said upper beam is supported rotatably on the free end portion of said crank arm by means of said free end supporting axle, and said lower beam has holding tools provided thereon for said conveyed object, wherein said transmission device for coupling together said free end supporting axle causes said upper beam to rotate.

4. The conveyance apparatus for a processing step according to claim 3, wherein said suspended supporting device is supported in a cantilevered fashion on the free end portion of said crank arm by means of said free end supporting axle, and suspended frame members of said suspended supporting device are respectively formed in an L shape as viewed from the front by means of a vertical section suspended rotatably from said upper beam and a horizontal supporting section projecting towards said processing liquid tank from the lower end of said vertical section.

5. A conveyance apparatus for a processing step in which travel rails are laid along said processing step in which a processing liquid tank is disposed, a movable body is disposed movably on said travel rails for movement in a direction of travel along said travel rails by means of a plurality of wheels, and a conveyed object held on said movable body is immersed into the processing liquid and processed, wherein said movable body comprises:

a suspended supporting device for supporting said conveyed object in such a manner that a posture of said object can be adjusted;

a raising and lowering device for raising and lowering said suspended supporting device with respect to said processing liquid tank; and a posture adjusting device for operating said suspended supporting device and adjusting the posture of said conveyed object, wherein said raising and lowering device comprises:

a first supporting axle disposed in a horizontal direction that is orthogonal to the direction of travel, at one of the front and rear of the movable body in the direction of travel;

a second supporting axle disposed in parallel to said first supporting axle at the other of the front and rear of the movable body in the direction of travel, and being linearly movable towards and away from said first supporting axle;

a crank arm supported rotatably on said second supporting axle and rotatably supporting said suspended supporting device at a free end portion thereof by means of a free end supporting axle;

a swinging arm fixed to said first supporting axle and having a free end portion thereof coupled to an intermediate position of said crank arm by means of a coupling axle; and an arm drive device for causing said crank arm to rotate about said second supporting axle, wherein said posture adjusting device comprises:

a second passive lever fixed to said second supporting axle;

a linear drive device for driving said second passive lever in pushing and pulling action; and a transmission device for coupling together said second supporting axle and said free end supporting axle, wherein a travel device causing said movable body to travel along said travel rails comprises a passive type travel device, wherein said passive type travel device comprises:

a friction section suspended below the movable body along the direction of travel, an idle pressure roller and a driven pressure roller disposed at regular intervals along said processing step against which said friction section abuts, and a roller drive device that drives said driven pressure roller in rotation.

* * * * *